United States Patent
Scardino

(10) Patent No.: US 7,946,454 B2
(45) Date of Patent: May 24, 2011

(54) SYSTEM AND METHOD FOR DISPENSING OF VISCOUS FOOD PRODUCT

(76) Inventor: Paul Scardino, Westwood, NJ (US)

( * ) Notice: Subject to any disclaimer, the term of this patent is extended or adjusted under 35 U.S.C. 154(b) by 245 days.

(21) Appl. No.: 12/270,988

(22) Filed: Nov. 14, 2008

(65) Prior Publication Data

US 2009/0071981 A1    Mar. 19, 2009

Related U.S. Application Data

(63) Continuation-in-part of application No. 11/940,906, filed on Nov. 15, 2007.

(60) Provisional application No. 60/871,195, filed on Dec. 21, 2006.

(51) Int. Cl.
*B67D 7/80* (2010.01)

(52) U.S. Cl. ......... 222/146.6; 222/1; 222/183; 222/325; 222/326; 222/333; 222/390

(58) Field of Classification Search ............... 222/146.6, 222/183, 608, 129.1, 325–327, 386, 146.5, 222/1, 390, 181.2, 105, 185.1, 333, 566–567, 222/52, 54, 63, 108; 62/389–390
See application file for complete search history.

(56) References Cited

U.S. PATENT DOCUMENTS

| | | | |
|---|---|---|---|
| 2,559,840 A | | 7/1951 | Arthur |
| 4,693,397 A | * | 9/1987 | Lang ............................. 222/137 |
| 5,398,643 A | * | 3/1995 | McElrath et al. .......... 119/51.11 |
| 5,816,455 A | | 10/1998 | Alpers |
| 6,264,066 B1 | * | 7/2001 | Vincent et al. ................... 222/95 |
| 7,163,128 B2 | * | 1/2007 | Savage ........................ 222/146.6 |
| 2005/0089604 A1 | * | 4/2005 | Pastore ........................... 426/101 |

FOREIGN PATENT DOCUMENTS

JP    2004696 A    1/1990

OTHER PUBLICATIONS

International Preliminary Report on Patentability, Intl. Application No. PCT/US08/83719. May 27, 2010. International Bureau of WIPO.
International Search Report and Written Opinion, Intl. Application No. PCT/US08/83719. Jun. 5, 2009, ISA/KIPO.

* cited by examiner

*Primary Examiner* — Frederick C. Nicolas
(74) *Attorney, Agent, or Firm* — The Marbury Law Group PLLC

(57) ABSTRACT

A system and method that portably stores, refrigerates, and dispenses a viscous, semi-solid food product. Cannoli cream is held in an open-top hopper with a lower outlet tube that is removably received inside an insulated and cooled portion of the dispenser housing through a door with an opening for the lower outlet tube. A horizontal dispensing nozzle is attached to the lower outlet tube from outside the door. The hopper is positioned under a piston assembly that moves a piston plate through the top of the hopper with a screw-jack. The piston assembly functions to pump cannoli cream from the hopper through the dispenser nozzle.

20 Claims, 24 Drawing Sheets

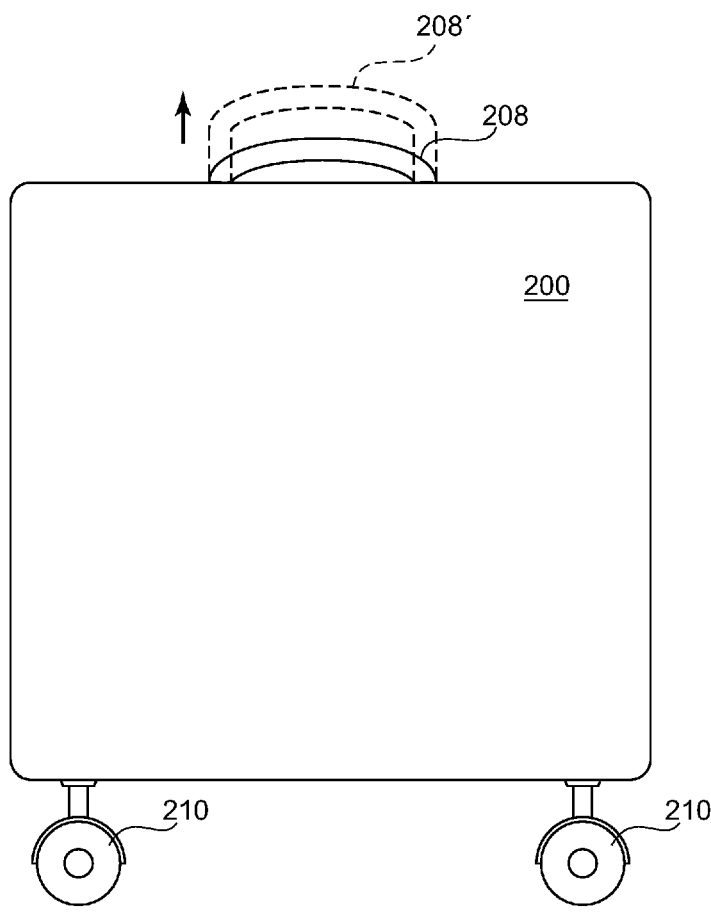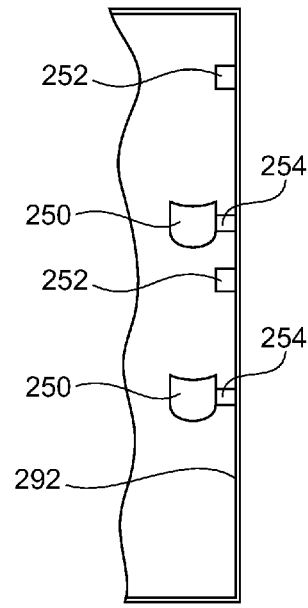
FIG. 5
FIG. 4

SYSTEM AND METHOD FOR DISPENSING OF VISCOUS FOOD PRODUCT

CROSS REFERENCE TO RELATED APPLICATIONS

This application is a Continuation-in-Part of U.S. application Ser. No. 11/940,906, filed Nov. 15, 2007, which claims priority to U.S. provisional patent application Ser. No. 60/871,195, filed Dec. 21, 2006, each entitled, "SYSTEM AND METHOD FOR DISPENSING OF VISCOUS FOOD PRODUCT," the specifications of which are hereby incorporated by reference in this application in their entirety for all purposes.

FIELD OF THE INVENTION

The present invention is directed to a system and method that portably stores, cools, and dispenses a viscous, semi-solid food product.

BACKGROUND INFORMATION

Traditionally, a cannoli shell should be held in a hand with the central hollow cavity horizontally oriented and the prepared cannoli cream is spooned into the cavity or forced into the cavity with a conventional pastry bag. When the pastry bag is empty it needs to be refilled, and refilling an already used bag is cumbersome. The capacity of cannoli cream that a pastry bag can hold is limited. This all means that the activity of refilling the pastry bag must be repeated often, which makes it both a time consuming and messy way to fill cannoli shells. When not in use, the pastry bag is promptly stored in a refrigerator to preserve the cannoli cream inside it. It can be seen that this traditional scheme for filling cannoli shells is not very efficient.

Storing food using refrigeration is a well established practice, and such storage has been combined with dispensing of food. Examples of dispensing of refrigerated food are found in U.S. Pat. No. 6,299,025 to Watanabe et al., U.S. Pat. Nos. 5,553,756 and 5,494,194, both to Topper et al., U.S. Pat. No. 6,923,006 to Walton et al., and U.S. Pat. No. 3,213,903 to Armstrong.

One problem with the dispensing structures of the arrangements described above is that they are not well adapted for use in filling cannoli shells with cannoli cream. The fixed, vertically oriented dispensers of these systems are not suitable for filling cannoli shells.

It is also noted that the storage and dispensing arrangements described above are bulky and do not lend themselves to being moved around easily in a kitchen or pastry shop.

What is needed is a system that keeps viscous, semi-solid food material cool, is capable of dispensing the food material into horizontally oriented cavities, and which is portable.

SUMMARY OF THE INVENTION

A first embodiment of the invention is a dispenser for filling cannoli shells with cannoli cream (the term "cream" or "filling" are used interchangeably herein to denote any viscous food material). The dispenser is portable so that it may be moved to any desired location. The dispenser has one or more cold packs to keep the cannoli cream chilled.

According to this first embodiment, the cannoli filling is held in a hopper that is removably received in a top portion of the dispenser that is sized to receivably house the hopper through a side opening. The top portion that receives the hopper has structures for holding one or more cold packs, such as ice or an ice substitute material to absorb heat energy.

A second embodiment is a dispenser for filling cannoli shells with cannoli cream. The dispenser is portable so that it may be moved to any desired location. The dispenser has a refrigeration unit to keep the cannoli cream chilled.

According to this second embodiment, the cannoli filling is held in a hopper that is removably received in a top portion of the dispenser that is sized to receivably house the hopper through a top opening. The top portion that receives the hopper is lined with evaporator coils from a refrigeration unit, the other components of the refrigeration unit (condenser coils, compressor, expansion valve, etc.) being housed in a bottom portion of the portable dispenser.

A third embodiment is a portable dispenser for filling cannoli shells with cannoli cream. The dispenser has one or more cold packs to keep the cannoli cream chilled. The use of cold packs is supplemented by a thermoelectric cooling system. The thermoelectric cooling structure waits in a standby mode until such time as the cold packs begin to lose the ability to maintain cool temperature in the cold chamber. The thermoelectric system then activates to provide a supplemental cooling capacity.

A fourth embodiment is dispenser used for filing cannoli shells with cannoli cream and which is sized for a counter-top or serving cart. The unit has an insulated refrigerated area for housing a removable hopper containing the cream. Temperature inside the unit is controlled using a thermoelectric cooling unit and ice packs (i.e., thermal holdover material), where the ice packs also provide back-up cooling when electricity is unavailable. The unit includes a door through which the hopper is loaded/unloaded and through which the cream is dispensed. A motor-driven piston plate is moved down into the hopper to expel cream through a nozzle on the outside of the door. The piston plate is removable for ease of cleaning and servicing.

According to the various embodiments, a piston driven mechanism is housed in the dispenser, the piston drive functioning to pump cannoli filling from the hopper to a dispenser nozzle. Optionally, the cannoli filling is pumped through a flexible tube to the nozzle.

One embodiment holds a viscous, flowable food material, stores the material at a cooled temperature, and dispenses the material.

Another embodiment stores a viscous, flowable food material, dispenses the material, and is portable.

Another embodiment stores a viscous, flowable food material at a cooled temperature and dispenses the material using a nozzle.

BRIEF DESCRIPTION OF THE DRAWINGS

FIG. 4 illustrates a detail view of ice pack holding cups structure of a cannoli cream dispenser according to the first.

FIG. 5 illustrates an elevation view of a cannoli cream dispenser according to the first embodiment showing retractable handle and wheel structures.

DETAILED DESCRIPTION

Figure 1:
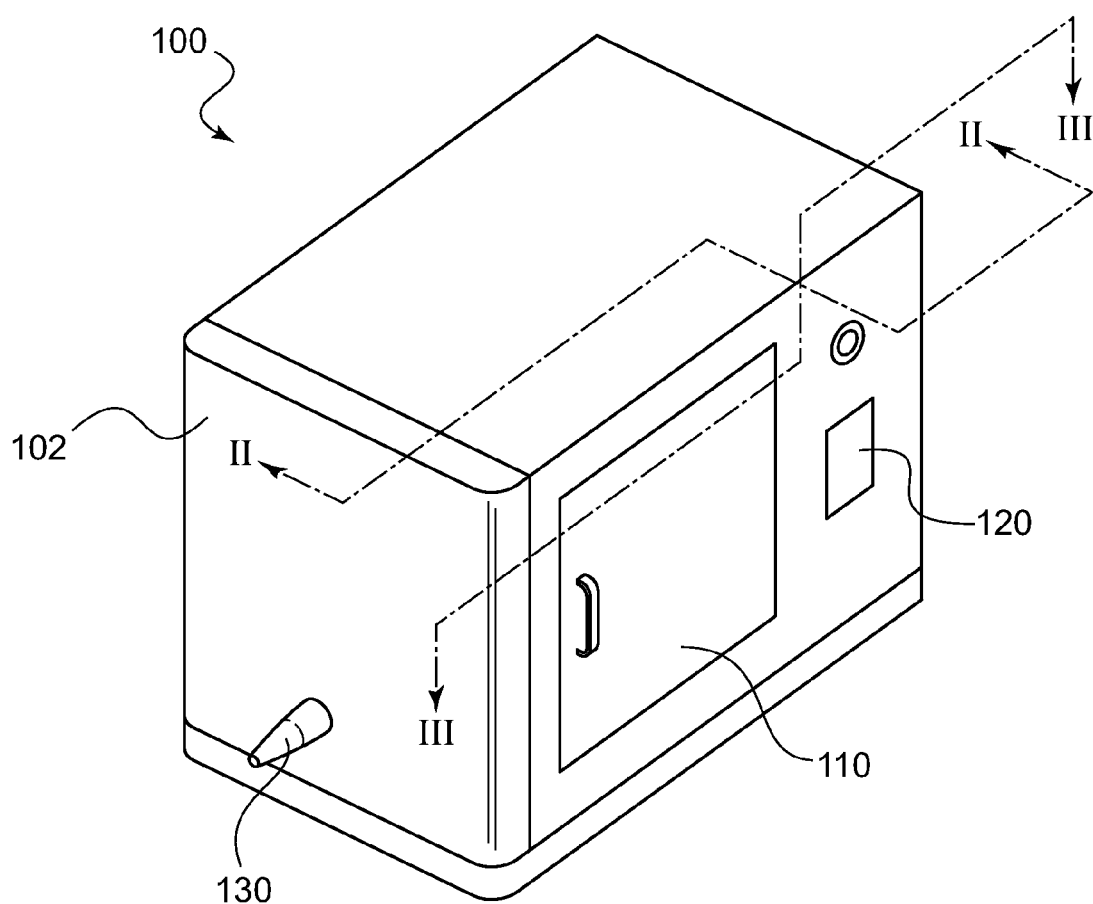
FIG. 1 illustrates a perspective view of a cannoli cream dispenser according to the first embodiment.

Referring to FIG. 1, a perspective view of a cannoli cream dispenser 100 is illustrated according to a first embodiment of the present invention. The dispenser has a side door 110 and a temperature readout 120 to indicate the internal temperature of cannoli cream held inside the dispenser. A nozzle 130, from which the cannoli cream is dispensed, projects from the front panel 102 of the dispenser.

Figure 2:
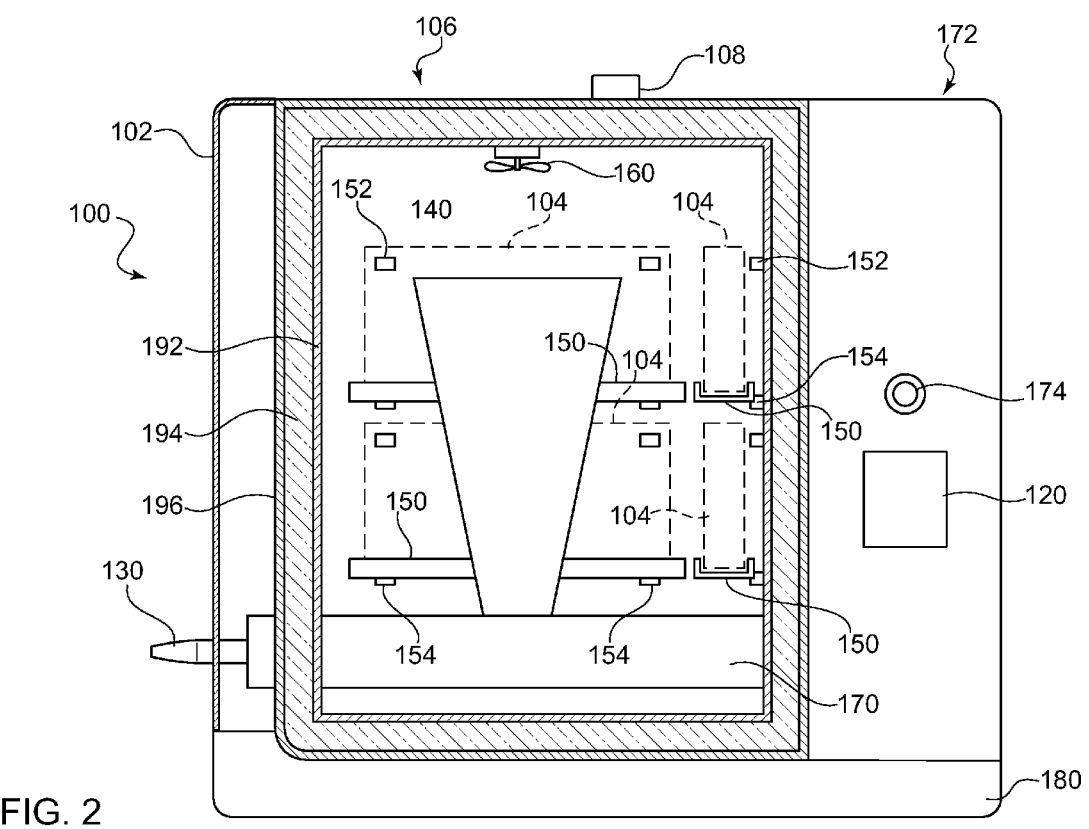
FIG. 2 illustrates an elevation partial section view of a cannoli cream dispenser according to the first embodiment.

Referring to FIG. 2, an elevation partial section view of a cannoli cream dispenser is illustrated according to the first embodiment of the present invention. The dispenser 100 is portable and contains structures to accommodate cold packs 104 (blocks of ice or other thermal storage media) to keep the cannoli cream filling chilled. The cannoli filling is held in a hopper 140 that is removably received through the door 110 (refer to FIGS. 1, 3, and 6) in the side of the dispenser 100 in a forward section 106 that is sized to receivably house the hopper 140. A magnetic latch 112 (refer to FIG. 6) is used to fasten the door 110 shut on the side of the dispenser. A transport handle 108 is mounted to facilitate moving the dispenser 100; either for placing it on a countertop or rolling it on removable wheels (refer to FIG. 5). The nozzle 130 projects from the front side 102 of the dispenser 100. The forward section 106 that receives the hopper contains removable cold packs 104 (shown in phantom) mounted on support rails 150.

The forward section 106 is insulated to help keep the temperature cold around the hopper 140. A layer of R6.5 (for example but without limitation) insulation 194 is sandwiched between a rigid inner wall 196 and a rigid outer wall 192. The walls 192, 196 are advantageously formed of plastic or metal (e.g., stainless steel).

A fan 160 is mounted inside the forward section 106 to cause circulation of air around and between the cold packs 104 and the hopper 140. Air flow between the cold packs 104 and the inner walls 196 is facilitated by spacers 152 and positioning of the support rails 150 with respect to the walls 196 by spacing connectors 154. The spacers 152 and the rails 150 keep the cold packs 104 positioned at a distance from the walls 196 so as to facilitate movement of air around the cold packs 104. In this view the cold packs 104 are shown in phantom to help illustrate the spacers 152.

A pump 170 draws product (e.g., cannoli filling) from the hopper 140 and directs it to the nozzle 130. The pump 170 may be electric, pneumatic, hydraulic, or manually powered.

The rear section 172 of the dispenser provides for housing of power and measurement devices. Power supplies for the fan 160 and pump 170 are housed in the rear section 172, as is the temperature measurement circuitry and display circuitry to support the temperature display 120. An emergency shutoff 174 is placed prominently on the exterior of the dispenser to provide an immediate safety power cutoff.

Base 180 structurally supports the rear section 172, the front section 106, and the front panel 102. The front panel 102 is removable for the purposes of ease of cleaning and so that the appearance of the front of the dispenser 100 can be customized. The front panel 102 may be formed of metal (e.g., stainless steel) or a food grade plastic material.

Figure 3:
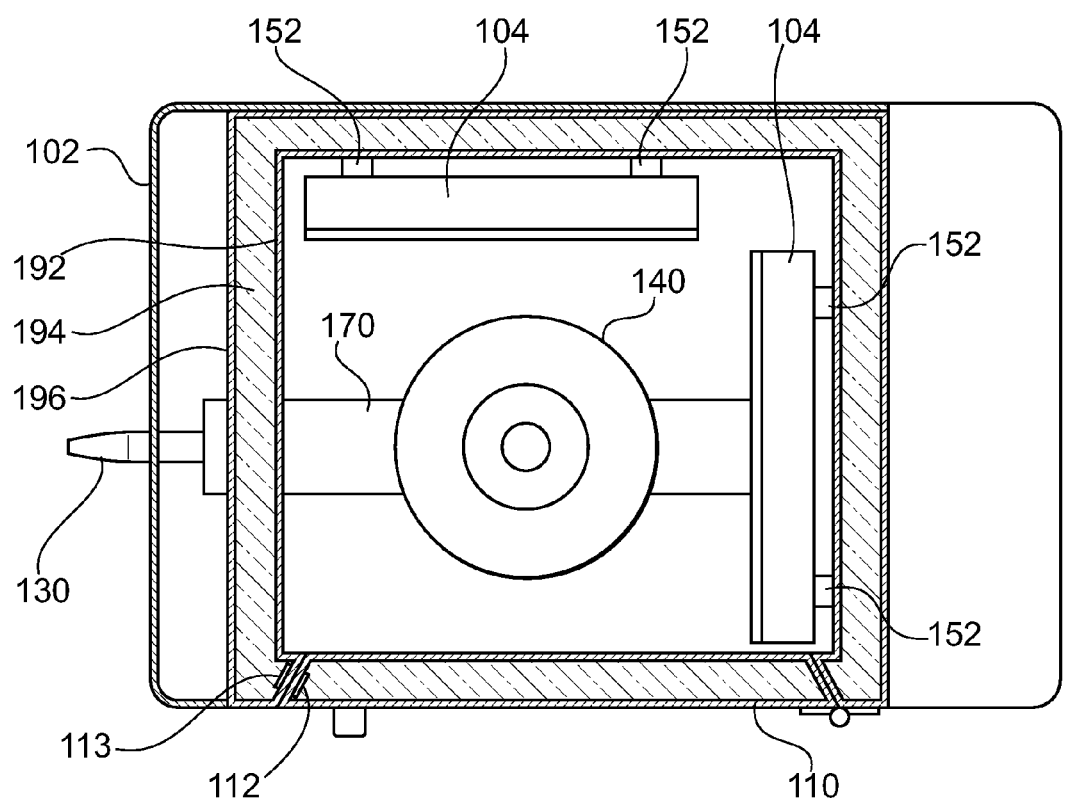
FIG. 3 illustrates a plan partial section view of a cannoli cream dispenser according to the first embodiment.

Referring to FIG. 3, a partial section plan view of a portable cannoli cream dispenser 100 is illustrated according to the first embodiment of the present invention. The dispenser 100 holds cold packs 104 to keep the cream filling chilled inside the hopper 140. The cannoli filling is held in a hopper 140 that is removably received through a door 110 in the side of the dispenser in the forward section 106 that is sized to receivably house the hopper 140. A magnetic latch, formed by magnetic members 112, 113 in the door and the door jamb, functions to hold the door 110 closed. The forward section that receives the hopper 140 has insulated walls with an insulation core 194 sandwiched between a rigid inner wall 192 and a rigid outer wall 196. The insulated space is lined with cold packs 104. The cold packs 104 are positioned to be spaced from the interior walls 192 of the forward section by spacers 152 to form a space between the cold pack and the adjacent wall through which air is free to flow.

Referring to FIG. 4, a detail view of optional ice pack holding trough structure of a cannoli cream dispenser is illustrated according to the first embodiment of the present invention. When blocks of ice are used as cold packs (or "ice packs"), the holders are formed as cup-shaped troughs 250 that catch ice melt. The troughs 250 are spaced apart from the inner wall 292 by spacing connectors 254. The ice blocks (not shown in this view for clarity) are spaced apart from the inner wall 292 by spacers 252 to permit free flow of air between the ice blocks and the inner wall 292.

The liquid water melted off of the ice packs is then routed out of the front section cold chamber via a fluid conduit. The water is held in a reservoir in the dispenser, or is optionally allowed to drain out of the dispenser.

Referring to FIG. 5, an elevation view of a cannoli cream dispenser is illustrated according to the first embodiment of the present invention and showing optional features. The dispenser 200 is optionally mounted on wheels 210 for ease of transport. The wheels 210 are removable. A retractable handle 208 is optionally provided to further enable moving the dispenser 200 around. The handle is shown in phantom in a retracted position 208' and in a stowed position 208. With wheels 210 being removable and the handle 208 being retractable, the dispenser 200 can either be placed on a countertop or rolled between work stations and storage.

Figure 6:
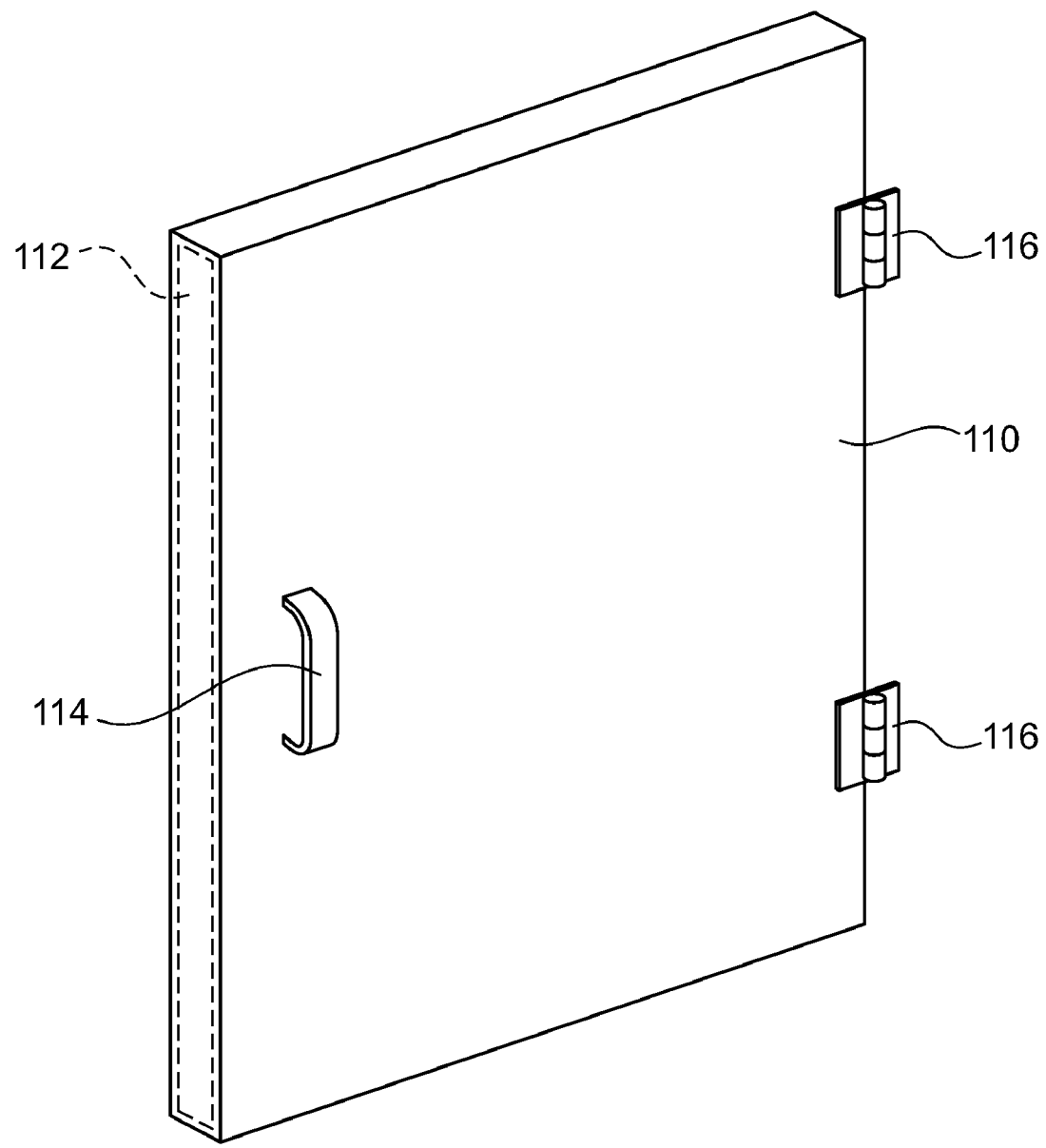
FIG. 6 illustrates a perspective detail view of a loading door for use on a cannoli cream dispenser according to the first embodiment.

Referring to FIG. 6, a perspective detail view of a loading door for use on a cannoli cream dispenser is illustrated according to the first embodiment of the present invention. The door 110 has an embedded magnetic member 112 as part of a magnetic latch to secure the door in its closed position. Opening of the door is via a pulling force on the handle 114 to overcome the hold force of the magnetic latch. The door 110 is pivotably cantilevered from hinges 116 mounted to the housing of the dispenser.

Figure 7:
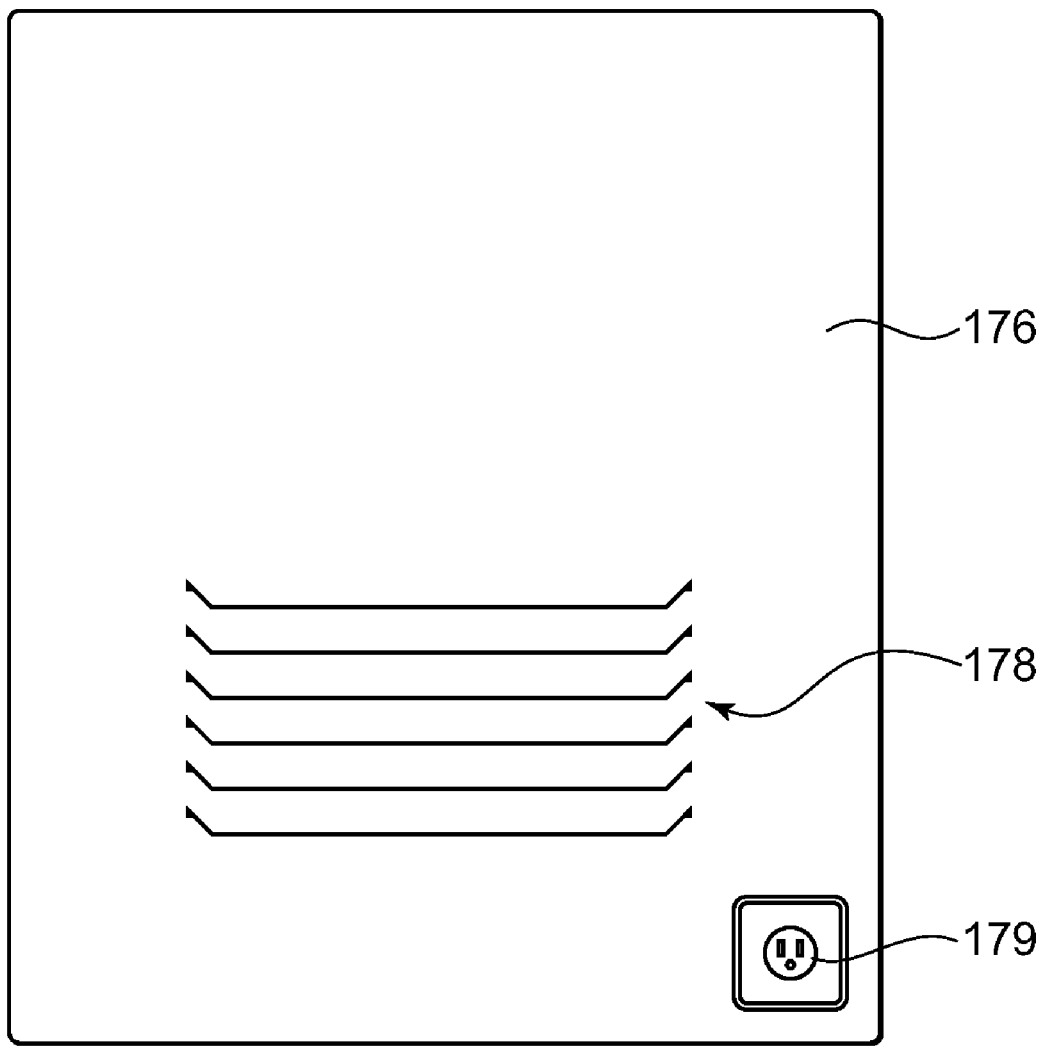
FIG. 7 illustrates a rear elevation view of a cannoli cream dispenser according to the first embodiment.

Referring to FIG. 7, a rear elevation view of a cannoli cream dispenser is illustrated according to the first embodiment of the present invention. Vents 178 are provided to enable air flow for cooling of the electrical and mechanical structures in the rear portion of the dispenser. The rear panel 176 is removable to enable servicing of the structures inside. A retractable power cord 179 is stored in the rear portion and projects out through the removable rear panel 176.

Figure 8:
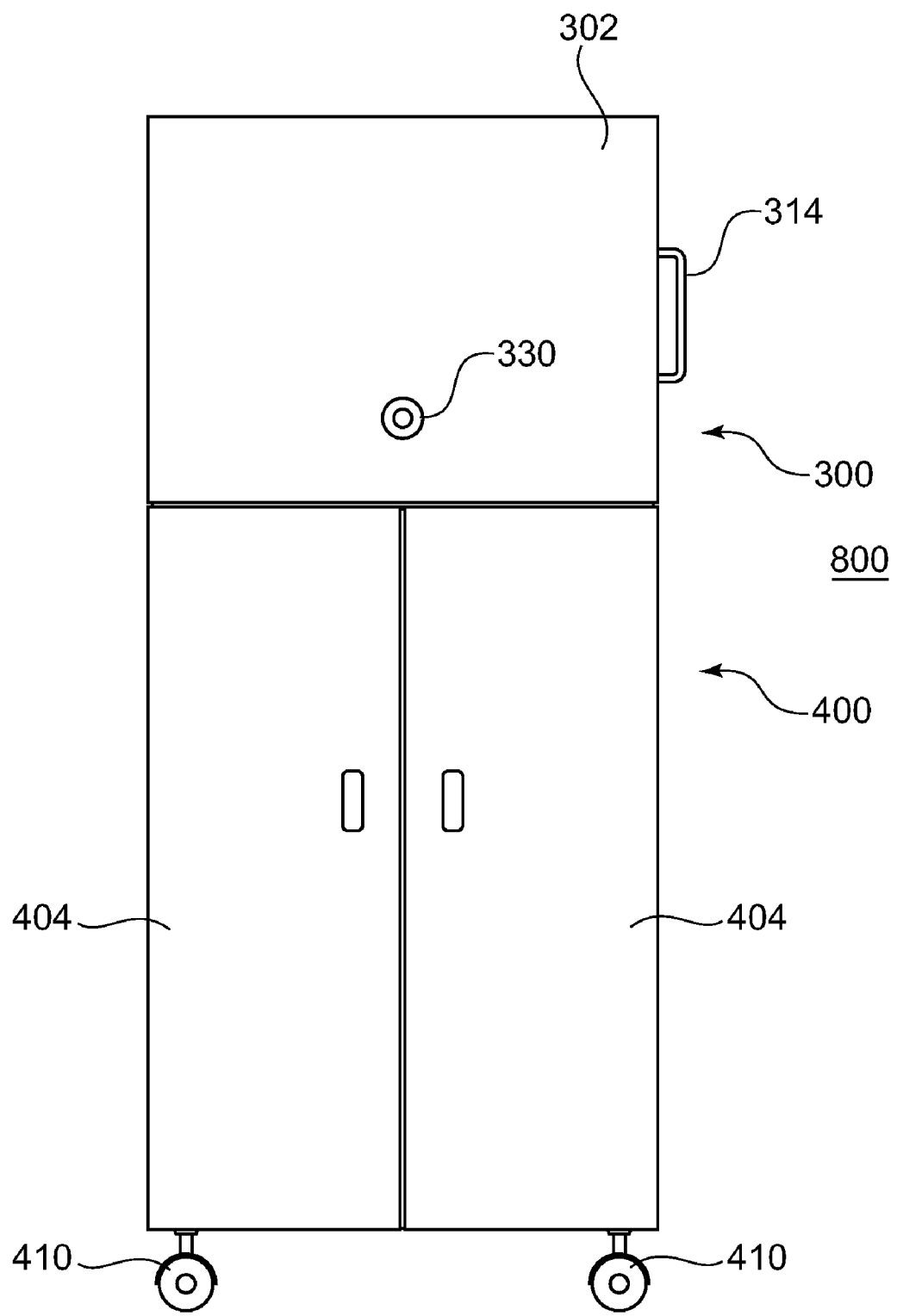
FIG. 8 illustrates an elevation view of a cannoli cream dispenser according to the first embodiment in combination with an accessory cabinet.

Referring to FIG. 8, an elevation view of a cannoli cream dispenser according to the first embodiment is illustrated in combination with an accessory cabinet. The combination 800 of the dispenser 300 atop the cabinet 400 is shown from the front. The dispenser has a nozzle 330 projecting from the front panel 302 and has a handle 314 for opening a side access door. The cabinet 400 is provided with wheels 410 to enable portability of the dispenser 300 while maintaining it at a serviceable operating height for use in a shop environment, such as a pastry kitchen or a delicatessen. Doors 402, 404 open to a shelved cabinet interior useful for storage.

Figure 9:
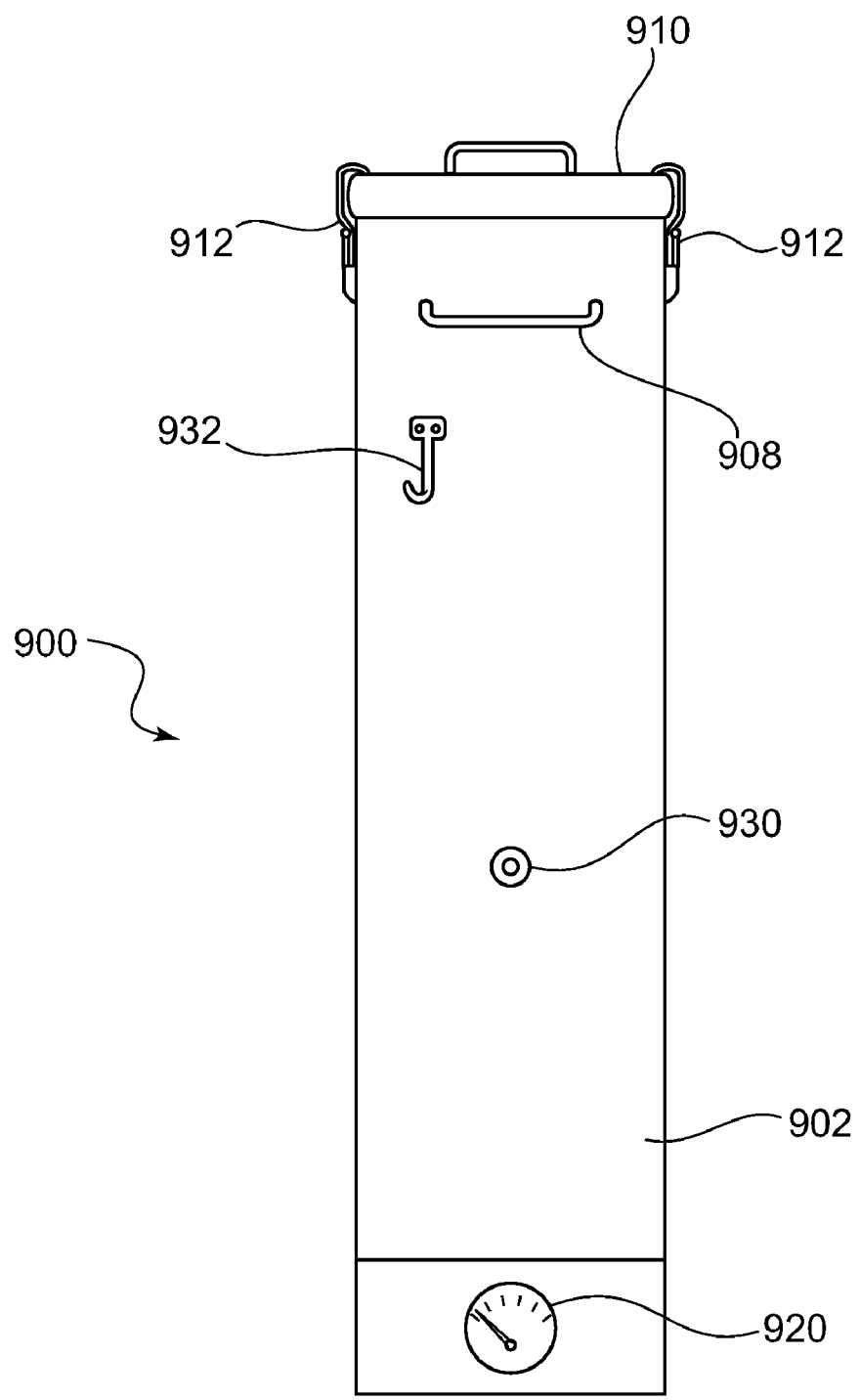
FIG. 9 illustrates an elevation view of a cannoli cream dispenser according to the second embodiment.

Referring to FIG. 9, a dispenser 900 for filling cannoli shells with cannoli filling is shown having a lid 910 at the top and a temperature gauge 920 to indicate the internal refrigeration temperature of the cannoli cream. Spring clips 912 are used to hold the lid 910 atop the dispenser. A transport handle 908 is useful to move the dispenser around, either for placing it on a countertop or rolling it on removable wheels. An outlet coupling 930 projects from the front of the dispenser housing 902. A hose (not shown) couples in fluid communication with the outlet coupling 930 and directs flow of cannoli cream out through a nozzle. A swivel hook 932 supports the hose and nozzle for storage.

Figure 10:
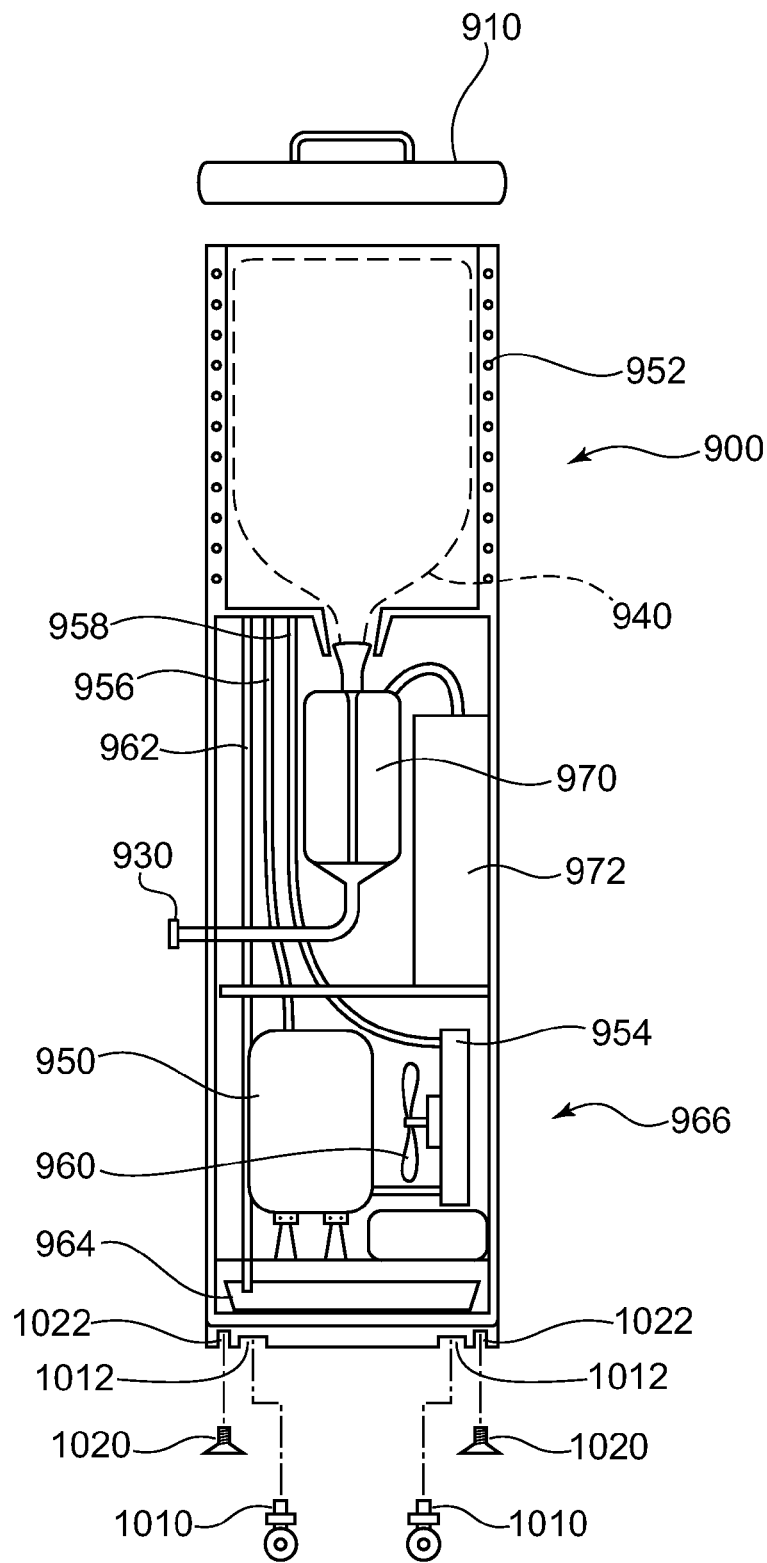
FIG. 10 illustrates an exploded view of a cannoli cream dispenser according to the second embodiment.

Referring to FIG. 10, the dispenser 900 is portable and contains a refrigeration unit to keep the cream filling chilled. The cannoli filling is held in a hopper 940 (shown in phantom) that is removably received in a top portion of the dispenser 900 that is sized to receivably house the hopper 940. Lid locks (refer to FIG. 9) are used to fasten the lid 910 down on the top of the dispenser. The top portion that receives the hopper 940 is lined with evaporator coils 952 from the refrigeration unit.

A piston driven mechanism 970 is housed in the center section of the dispenser. The piston drive 970 functions to pump cannoli filling from the hopper 940, out through the outlet 930, and through a flexible tube (not shown) to a dispenser nozzle. The center section also includes space to accommodate storage of the flexible tube and nozzle in a refrigerated condition. The piston drive 970 may be electric, pneumatic, hydraulic, or manually powered.

Other components of the refrigeration unit (condenser coils 954, compressor 950, expansion valve, etc.) are housed in a bottom portion of the portable dispenser. Cooling lines 956 and 958 provide for flow of working fluid between the evaporator 952 and the other refrigeration components. A fan 960 sends air through the condenser 954 and a ventilation louver 966 provides an exhaust path for heat laden air.

A pan 964 at the bottom of the dispenser structure catches any drainage. Drain line 962 provides a fluid path from condensate from the top of the dispenser to reach the pan 964. Electrical power to operate the refrigeration compressor 950 is provided via a retractable electrical cord disposed in the bottom portion. A power supply 972 provides power to operate the piston drive 970.

The underside of the dispenser has threaded bores 1022 for fixing of legs 1020 with suction cups to hold the dispenser in place on a counter top, and alternatively, receptacles 1012 for fixing wheels 1010 to roll the dispenser 900 around easily on the floor.

Figure 11:
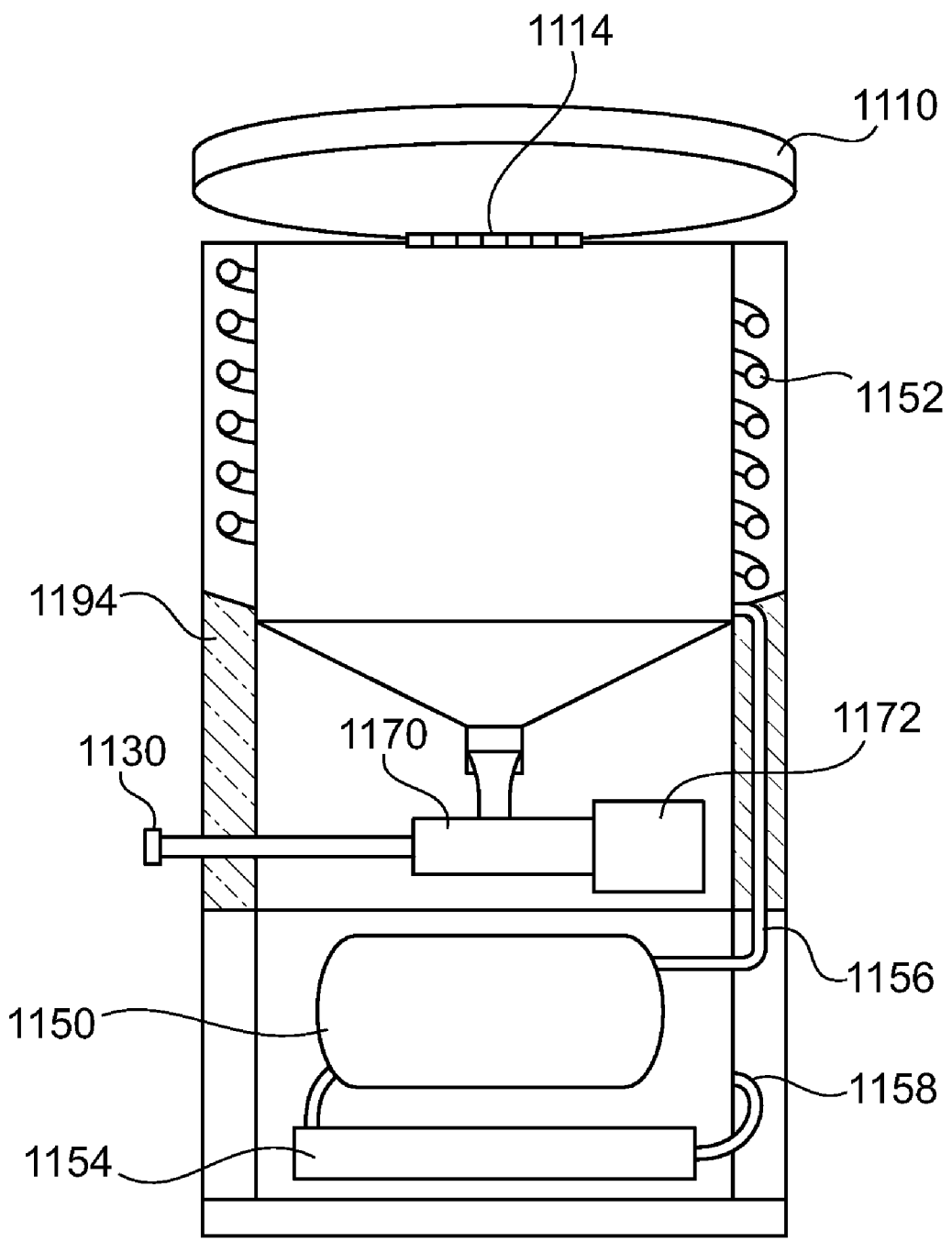
FIG. 11 illustrates a section view of a cannoli cream dispenser according to the second embodiment.

Referring to FIG. 11, the dispenser is a vertically elongated structure with a stainless steel outer surface to the housing. The housing has an inner jacket 1192 to allow condenser coil tubing 1152 to coil around the area that is to receive refrigeration and to provide a passage way for the ejection system 1170, 1172 wiring and for drainage of condensate. The top portion of the dispenser houses the cannoli cream while being refrigerated. This top portion is accessed via a lid 1110 on a hinge 1114 through which a hopper (refer to FIG. 10) is lowered. The middle portion has an insulation layer 1194 and contains a dispensing system with a piston drive 1170 and power supply 1172 that moves the cannoli cream in a controlled manner from the dispenser through outlet connector 1130 and into the cannoli shell by way of a flexible hose and nozzle (or tube). The bottom section houses the refrigeration unit (compressor 1150 and condenser 1154) that connects to the condenser coil 1152 via refrigeration lines 1156, 1158.

Figure 12:
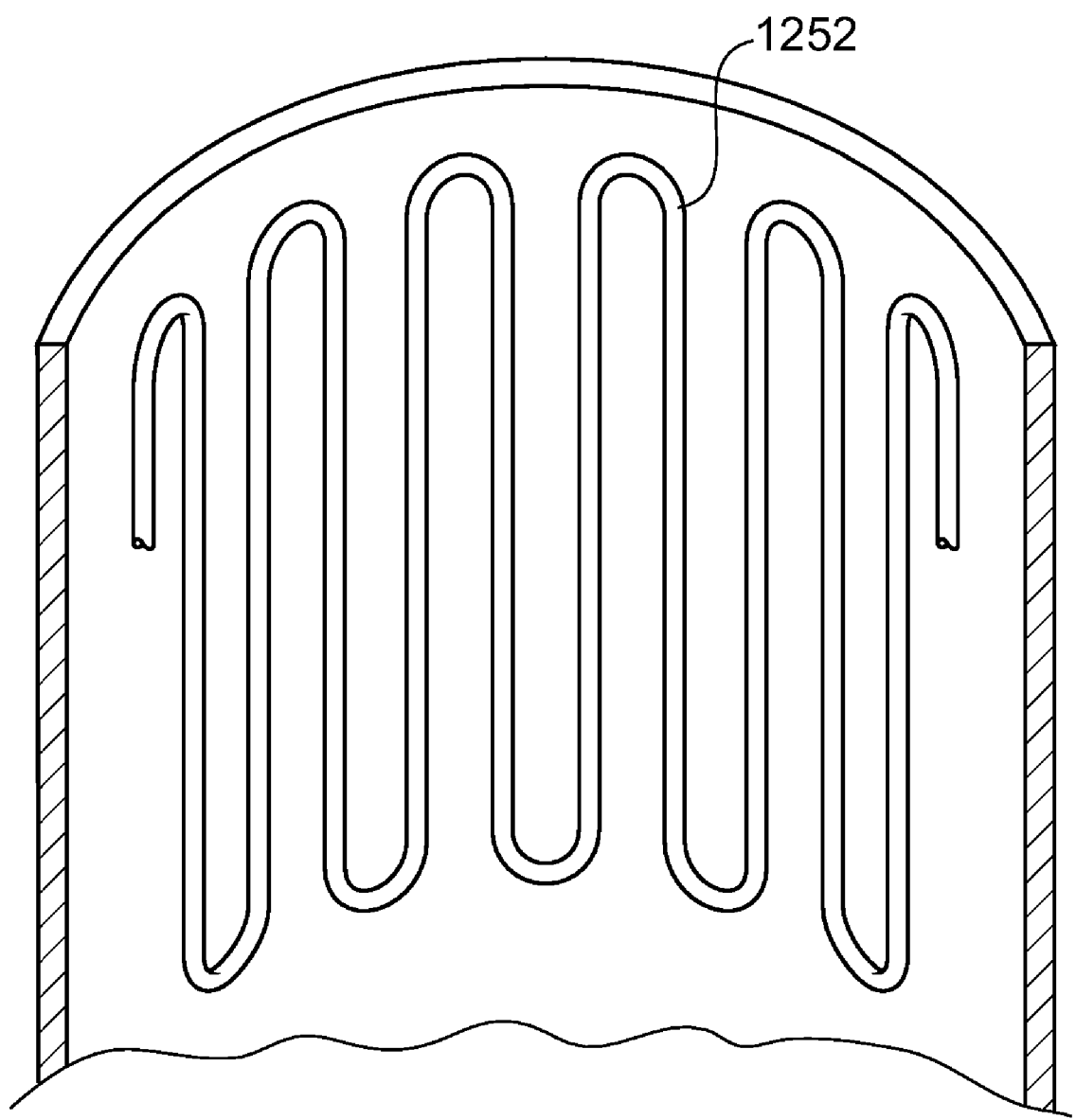
FIG. 12 illustrates a detail view of refrigeration coil structure of a cannoli cream dispenser according to the second embodiment.

Referring to FIG. 12, a detail view shows how a refrigeration coil 1252 (i.e., evaporator coil) according to an exemplary embodiment surrounds the inner jacket in the refrigerated section. The vertical zig zag coil pattern 1252 provides for vertically even temperature distribution in the cooling chamber.

Figure 13:
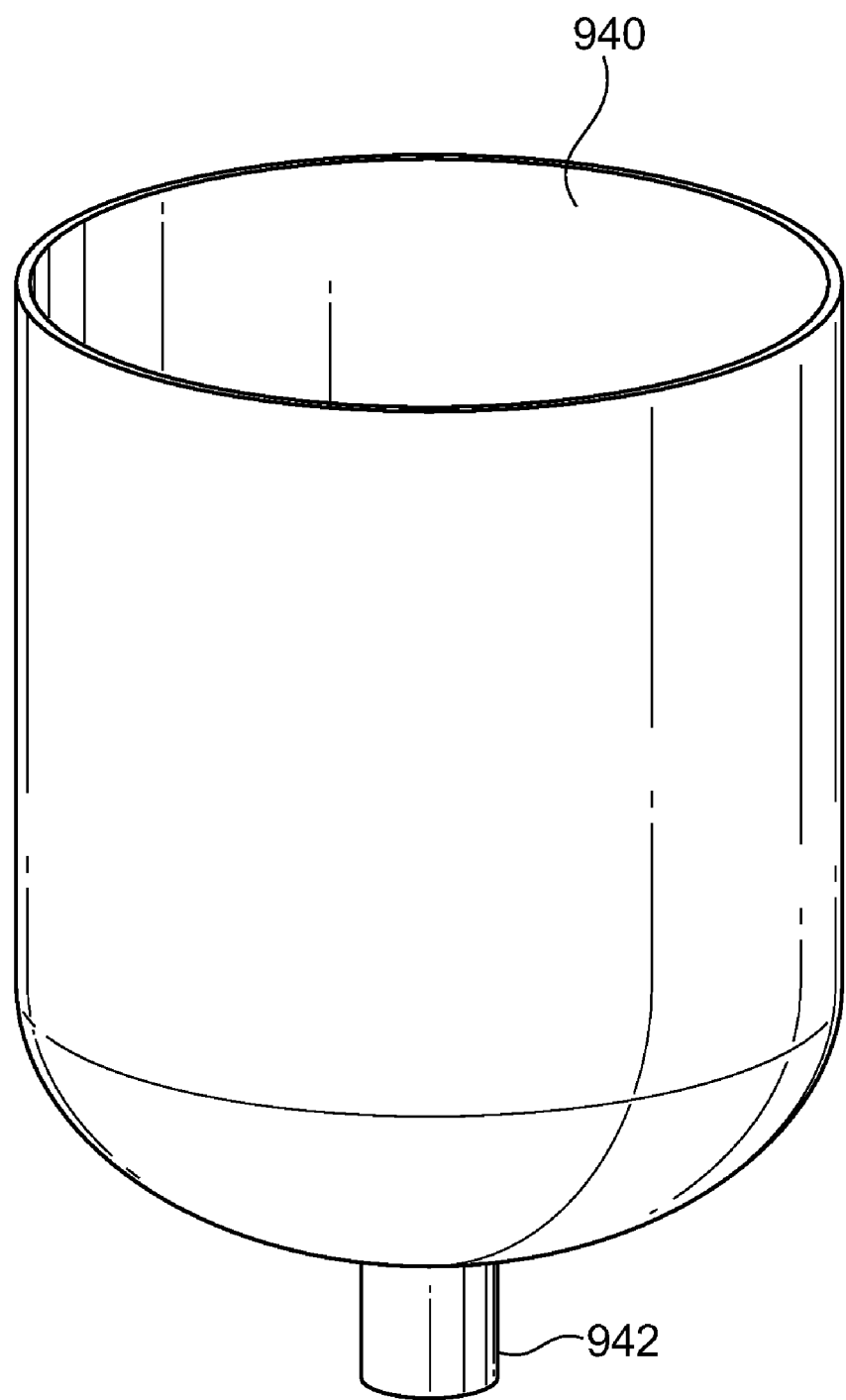
FIG. 13 illustrates a removable drop-in hopper for use in a cannoli cream dispenser according to the second embodiment.

Referring to FIG. 13, a drop-in removable hopper 940 is shown for holding the cannoli cream. The hopper 940 being removable provides convenience for cleaning and also permits the hopper to be removed from the dispenser and stored at night in a larger refrigerator so that the dispenser's refrigeration structure can be turned off to save energy. The narrow passage 942 at the bottom of the hopper 940 directs the contents of the hopper into the piston drive mechanism for dispensing.

Figure 14:
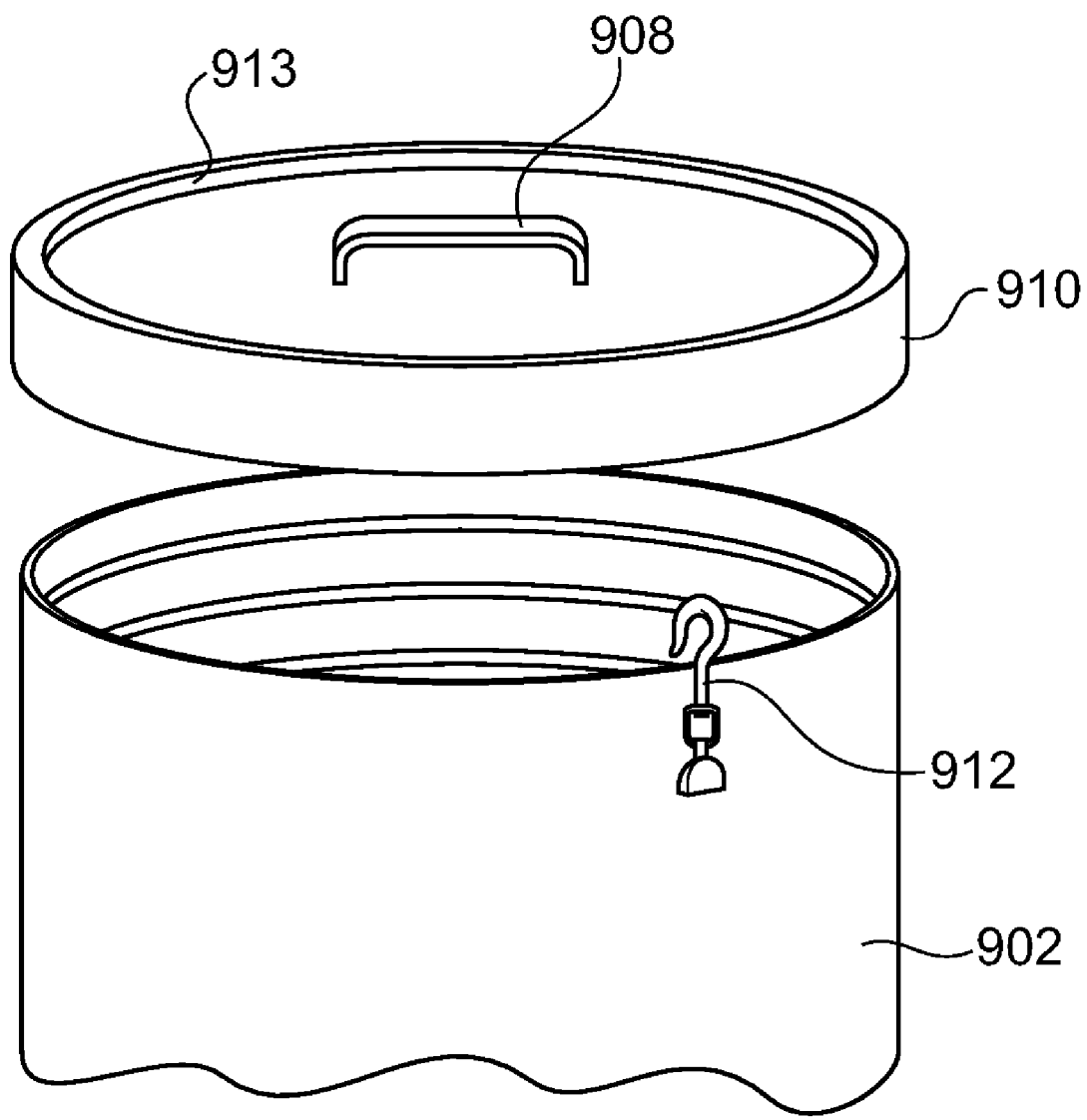
FIG. 14 illustrates a detail view of a lid and latch structure of a cannoli cream dispenser according to the second embodiment.

Referring to FIG. 14, the lid 910 is grasped via a handle 908 and is secured according to the second embodiment via a swivel hook 912 that engages a ledge 913 around the upper edge of the lid 910.

Figure 15:
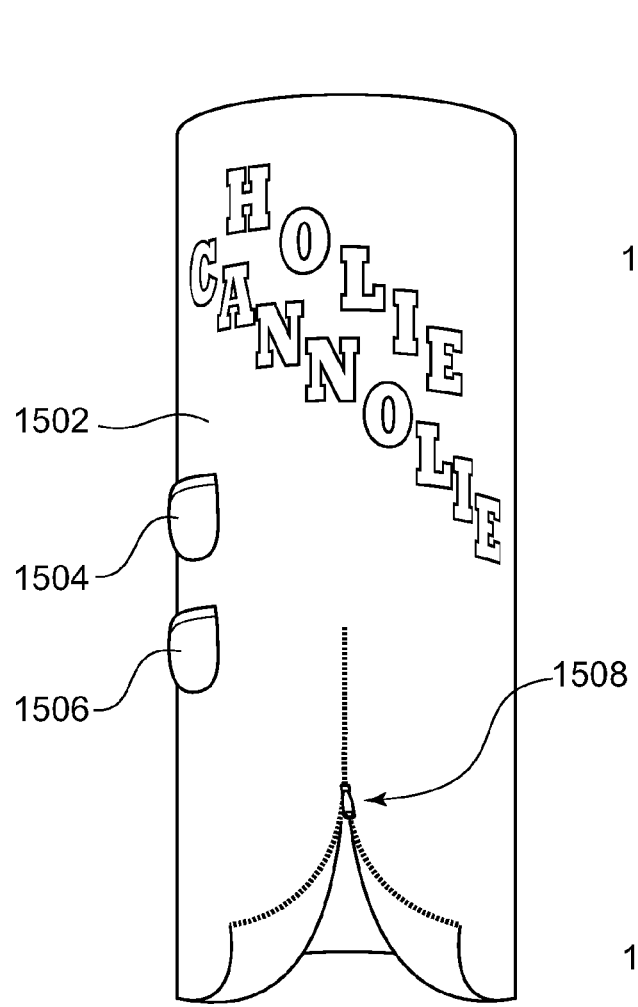
FIG. 15 illustrates a front elevation view of a jacket for use on a cannoli cream dispenser according to the second embodiment.
Figure 16:
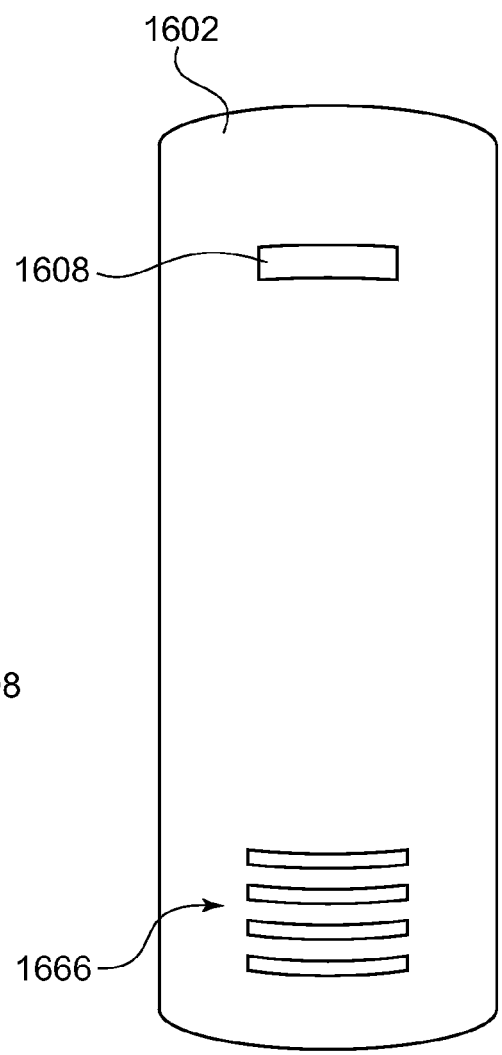
FIG. 16 illustrates a rear elevation view of a jacket for use on a cannoli cream dispenser according to the second embodiment.

Referring to FIGS. 15 and 16, an outer blanket for the cannoli cream dispenser provides insulation and storage. For added insulation and for scratch protection, an outer blanket is optionally placed over the outside surface of the dispenser. A zipper 1508 partially opens the front side 1502 of the outer blanket for ease of installation and removal. Wheel pockets

1504, 1506 provide for ease of storage for the dispenser's wheels when it is being used on a countertop and portability is not needed. A handle on the back of the dispenser is accessible through a handle slot 1608 in the back side 1602 of the outer blanket. Ventilation for exhaust of heated air from the refrigeration unit is provided through slots 1666.

The wheels and the compact size of the dispenser give it the property of being readily portable. This is advantageous for maximizing useful space in a kitchen.

By having the lid in the top of the dispenser, rather than on the side, the refrigerated dispenser maximizes its energy efficiency. Heat energy is less likely to leak into the refrigerated compartment of the dispenser via seals around the top of the dispenser than via seals around a side-mounted door. The advantage of the side-mounted door of the first embodiment is ease of use.

The dispenser having a hose and nozzle for dispensing the cannoli cream is useful because it allows the user to hold the cannoli shell at any desired angle for filling (typically horizontally) rather than the undesirable vertical orientation that would be necessary with the fixed, vertically oriented dispenser apertures that have been used in the past.

According to one embodiment, the dispenser is about 36 inches tall with a diameter of about 8 to 10 inches. Each of the three sections of the dispenser is about 12 inches tall. The hopper is sized to hold about 15 pounds of cannoli cream, although this is not meant as a limitation. The nozzle is adapted to dispense portion controlled amounts of cannoli cream for each cannoli shell.

Figure 17:
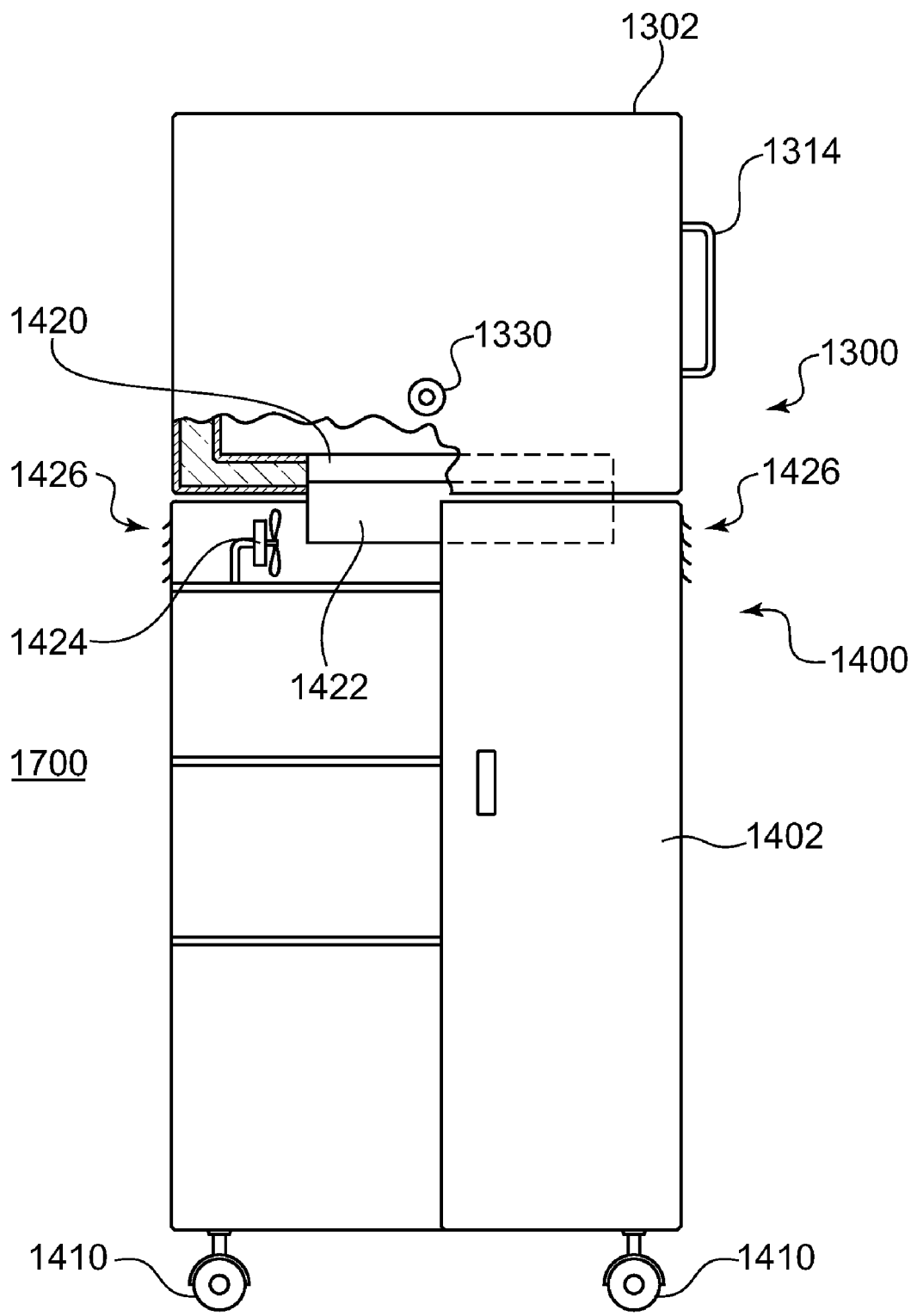
FIG. 17 illustrates an elevation view of a cannoli cream dispenser according to the third embodiment.

Referring to FIG. 17, an elevation view of a cannoli cream dispenser is illustrated according to a third embodiment. The dispenser 1700 according to the third embodiment combines a dispenser 1300 substantially like that of the first embodiment with a cabinet 1400. The dispenser has a nozzle 1330 projecting from the front panel 1302 and a door handle 1314 for a side access door. The cabinet 1400 has wheels 1410 and doors to enclose the front of the cabinet (the left door is omitted for ease of illustration, with only right side door 1402 shown).

The use of cold packs for cooling is supplemented by an auxiliary cooling system. A thermoelectric cooler 1420 employing Peltier cells is disposed in the bottom wall of the dispenser 1300 and has a heat sink 1422 extending out from the bottom of the dispenser into the top of the cabinet 1400. A fan 1424 moves air through the louvers 1426 and through the heat sink to exhaust heat energy from the cabinet. To provide for extended use time, the thermoelectric cooling structure 1420, 1422, 1424 waits in a standby mode until such time as the cold packs begin to lose the ability to maintain cool temperature in the cold chamber. At that time the thermoelectric system provides a supplemental cooling capacity. The thermoelectric system is utilized to provide a supplemental cooling function rather than primary cooling because it is less energy efficient than ice or other phase change cold pack devices.

Such a system can be useful in a restaurant setting. Further, since the unit is portable and easy to clean, it will find use for party rentals and private functions as a portable novelty dessert dispensing system.

Figure 18:
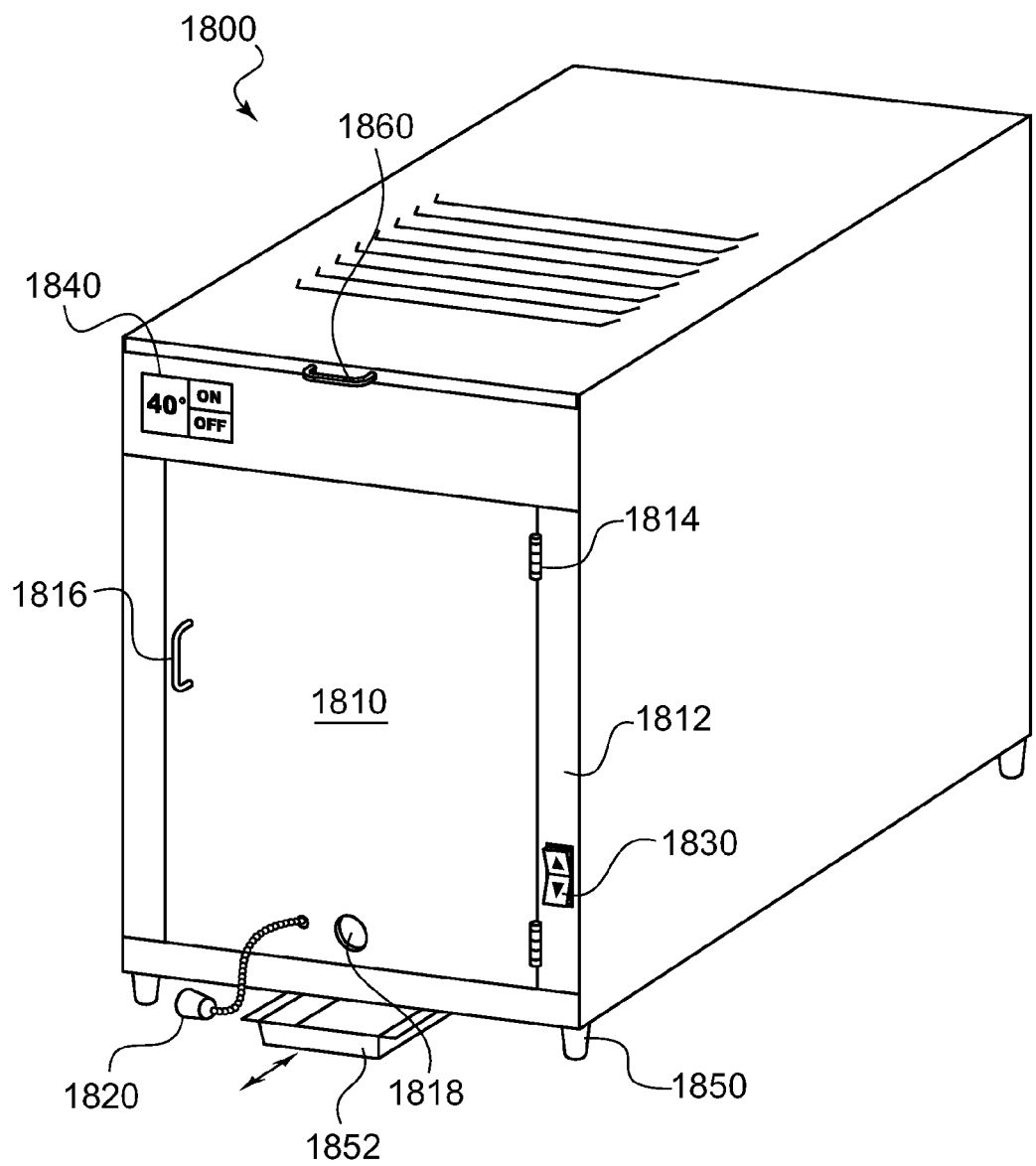
FIG. 18 illustrates a perspective view of a cannoli cream dispenser according to a fourth embodiment.

Referring to FIG. 18, a perspective view of a cannoli cream dispenser is illustrated according to a fourth embodiment. The dispenser 1800 according to a fourth embodiment includes an insulated cabinet having an insulated front-mounted door 1810 mounted to insulated walls 1812 via hinges 1814. The door 1810 includes a door handle 1816 of any suitable design on a side generally opposite of the hinges 1814. The door 1810 further includes an opening or hole 1818 through which cannoli cream is dispensed through a nozzle (not illustrated). Preferably, the door 1810 also includes a stopper or nozzle cap 1820 that can be attached to the door 1810 or unit 1800 by a chain, leash or other suitable means.

At a lower end of the dispenser 1800, a plurality of legs 1850 support the unit and are preferably stainless steel, rubber, or stainless steel with rubber tips. A drip tray 1852 is provided under nozzle opening or hole 1818 and is preferably slidable, to facilitate use under a nozzle and storage during transport, and/or removable to facilitate cleaning.

A rocker switch 1830 on the front of dispenser 1800 is operated to move the piston down to dispense cannoli cream from a hopper and to move the piston up to allow replacement of an empty hopper or cleaning of the piston plate. While use of a rocker switch is preferred, any other suitable switch or switches can be used, including but not limited to membrane switches, toggle switches, sliding switches, rotary switches, tact or touch switches, etc. A separate DC speed controller assembly (see FIG. 26) can be incorporated into the motor drive circuit so as to allow an operator to variably adjust the speed of the motor so as to control the rate at which the piston expels cannoli cream through an airtight spout or nozzle. In order to prevent leakage of the cannoli cream, an operator can briefly move the piston upward after dispensing a desired amount or an automatic means can be used to raise the piston a small amount. Such means can include a suitably configured mechanical spring on the switch or piston or a relay operated circuit that reverses the motor briefly after downward operation. In this manner, cannoli cream will be pulled pack in from the edge of the dispensing nozzle.

The front of the dispenser 1800 further includes a thermoelectric cooling system control 1840 that includes an on/off switch for the cooling system as well as a temperature indicator display. Control 1840 preferably includes an indicator light (or lights) to indicate the operational status of the thermoelectric cooling unit. It may also be advantageous to have a battery for the temperature indicator display so as to let the display operate when the unit is without power, such as when being transported or used away from a power source. The front of the dispenser 1800 can also include a pull handle 1860 to assist in removing a top panel of the unit to access the top mechanical compartment (see FIGS. 25A and 25B). The handle 1860 can take any suitable form and may be recessed, hinged, etc.

Figure 19:
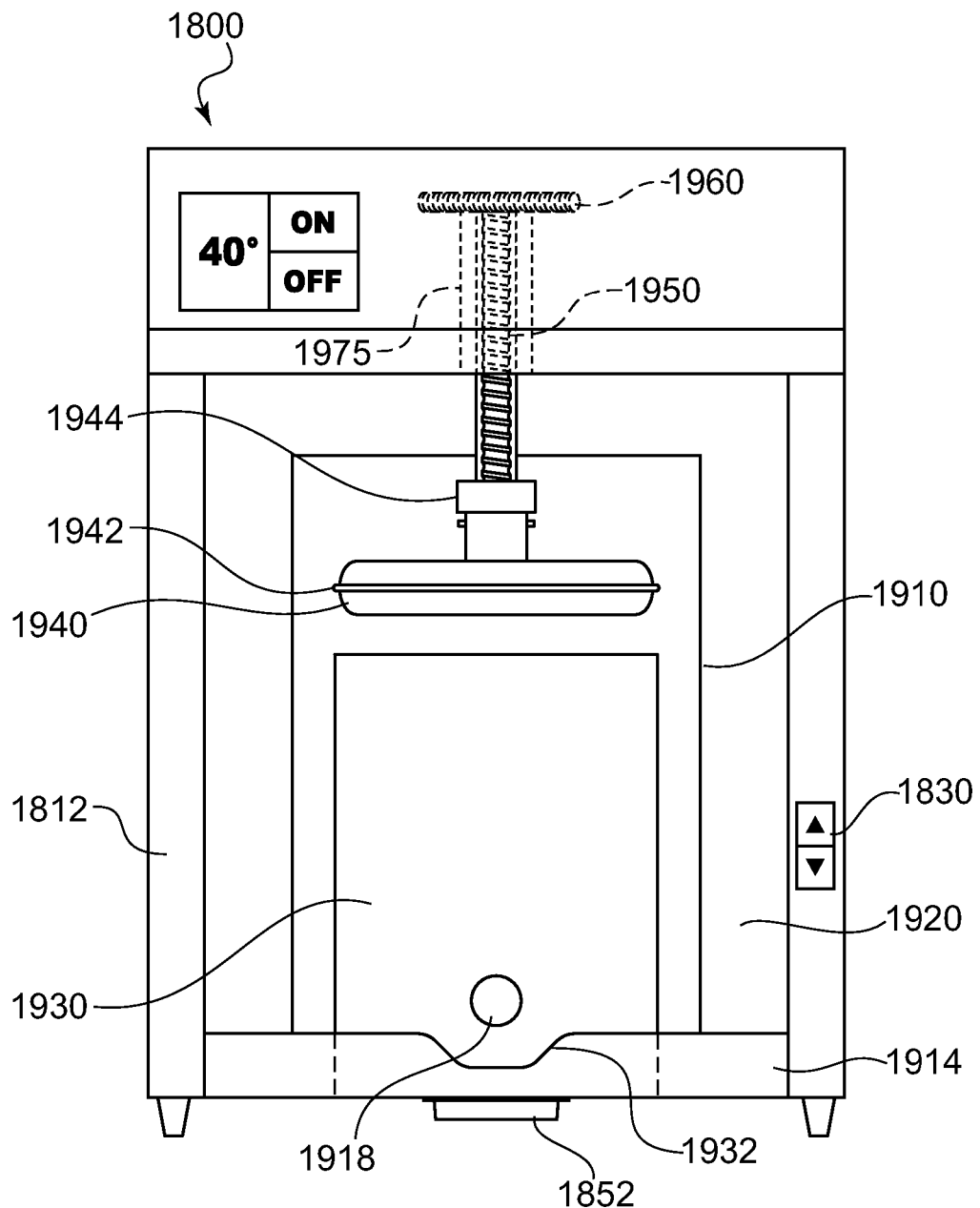
FIG. 19 illustrates a partial front sectional view of a cannoli cream dispenser according to a fourth embodiment.

Referring to FIG. 19, a partial front sectional or plan view of a cannoli cream dispenser is illustrated according to the fourth embodiment, in which identically numbered elements refer to the same elements described with respect to FIG. 18. With the front door not shown, FIG. 19 illustrates an interior of the dispenser 1800. A support wall 1910 extends upward from an insulated bottom wall 1914 to form the compartment in which hopper 1930 is stored and provide support for components mounted above the compartment. Pockets 1920 are formed between the outer insulated walls 1812 and the support wall 1910 and hold ice packs or other holdover material that can keep the cannoli cream cold when the thermoelectric cooler is not operating. The pockets can hold removable ice packs or can be filled with a holdover material.

The bottom wall 1914 is insulated and preferably lined on the inside with stainless steel. Bottom wall 1914 supports the hopper 1930 and is shaped to accommodate a well 1932 formed into the bottom of hopper 1930. The well 1932 directs cannoli cream to a nozzle hole 1918 (typically a threaded tube) in the hopper 1930, and further acts to align and position the hopper 1930 relative to the opening in the front door and the piston plate 1940. The piston plate 1940 includes an o-ring 1942 and has a stem that attaches to a coupling 1944 on screw or telescoping screw-jack 1950 that is driven by a gear 1960. In a preferred telescoping embodiment, the gear 1960 drives a tube 1975 from which the screw 1950 telescopes. By telescoping in this manner, a screw that extends through the top of the unit when retracted can be avoided.

Figure 20:
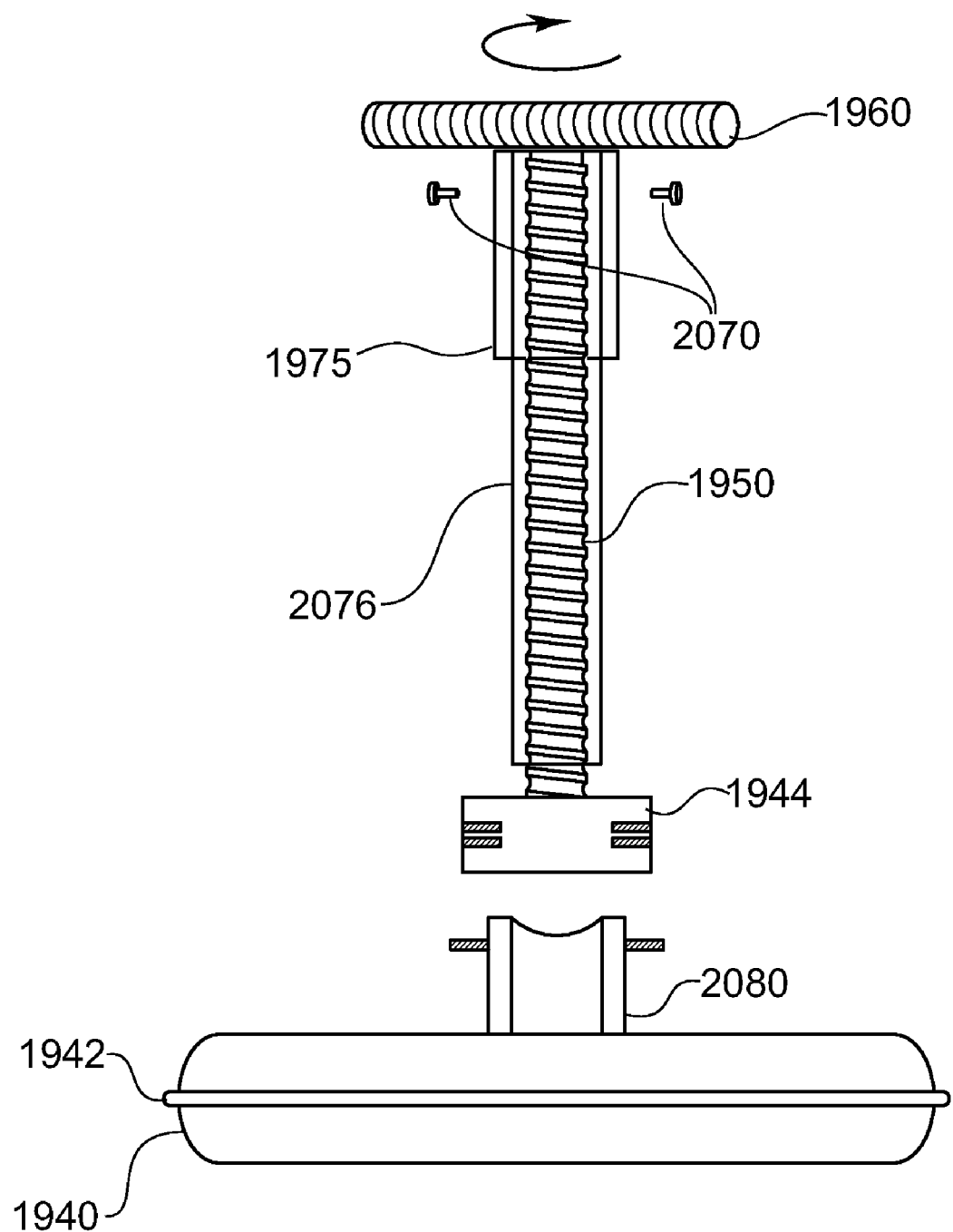
FIG. 20 illustrates an exploded view of a piston assembly of a cannoli cream dispenser according to a fourth embodiment.

Referring to FIG. 20, an exploded view of a piston assembly of a cannoli cream dispenser is illustrated according to the fourth embodiment. The piston assembly includes piston plate 1940, o-ring 1942, and stem 2080. The stem 2080 can attach to coupling 1944 in any suitable manner, but is preferably done easily by hand, such as by a bayonet mount or threaded mount. The coupling 1944 is mounted rigidly at the end of screw 1950 of the telescoping screw-jack. While the screw 1950 does not need to be telescopic, it is a preferred embodiment. In one possible embodiment, the gear 1960 turns a cylinder 1975 or 2076 (in which 1975 can then be a bearing sleeve). When the cylinder (1975 or 2076) is turned, screw threads on an inner surface of the cylinder will push the screw 1950 in a direction normal to rotation. The screw 1950 can have a longitudinal slot (not showing) that engages a guide to prevent rotation with the cylinder. Set screws 2070 can them be installed in the slot to limit vertical movement of the screw relative to the guide.

Figure 21:
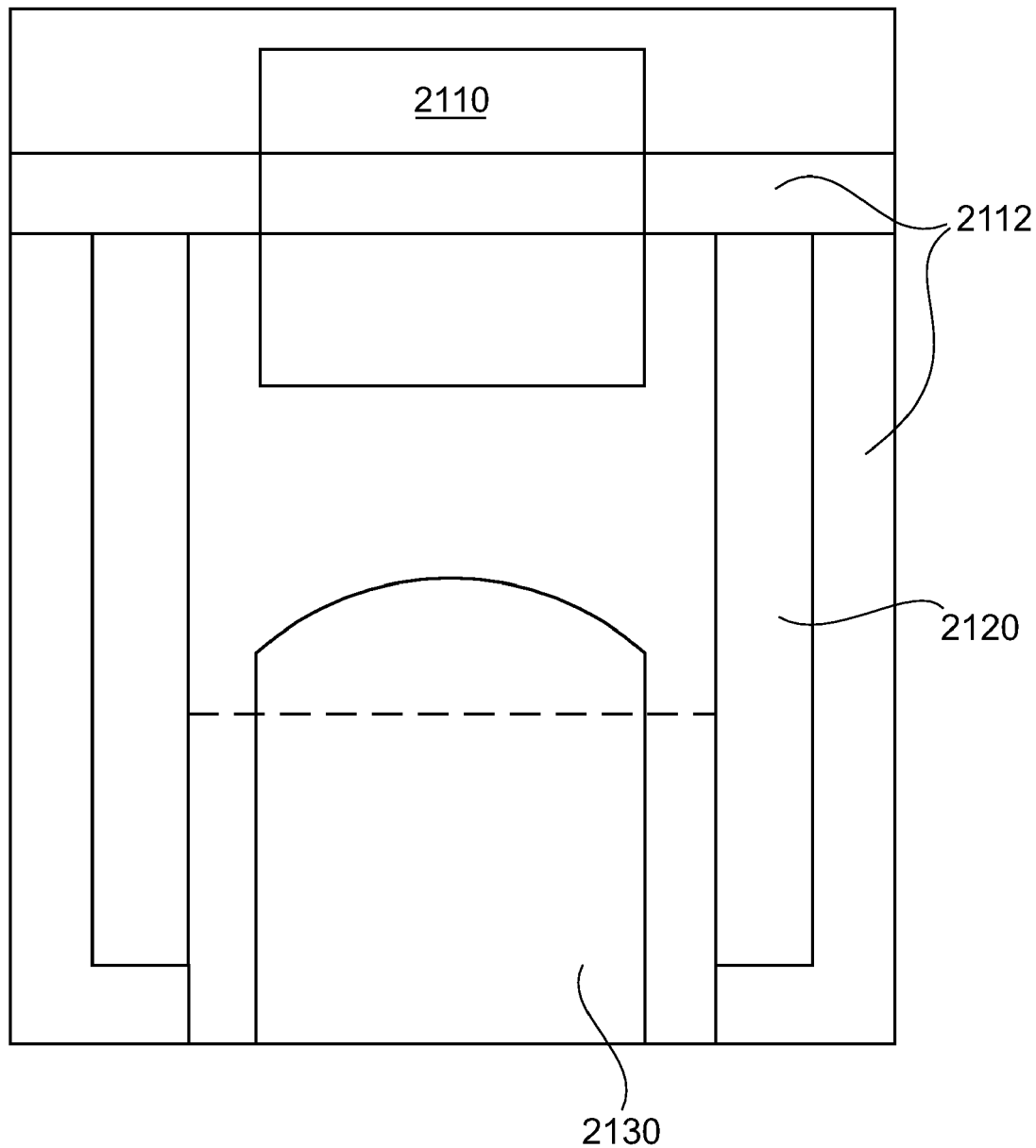
FIG. 21 illustrates a top plan view of a cannoli cream dispenser according to a fourth embodiment.

Referring to FIG. 21, a top plan/sectional view of a floor of a cannoli cream dispenser is illustrated according to a fourth embodiment. The floor of the hopper compartment of the dispenser includes a hopper slot 2130. The compartment is defined by the insulated door (not shown) and the insulated walls 2112. The compartment is cooled by a thermoelectric cooler 2110 that has a cold side that extends through the rear insulated wall 2112 (and with a hot side on an exterior of the wall) and ice pack slots 2120 provide additional cooling by absorbing heat, such as when the thermoelectric cooler 2110 is not operating.

Figure 22:
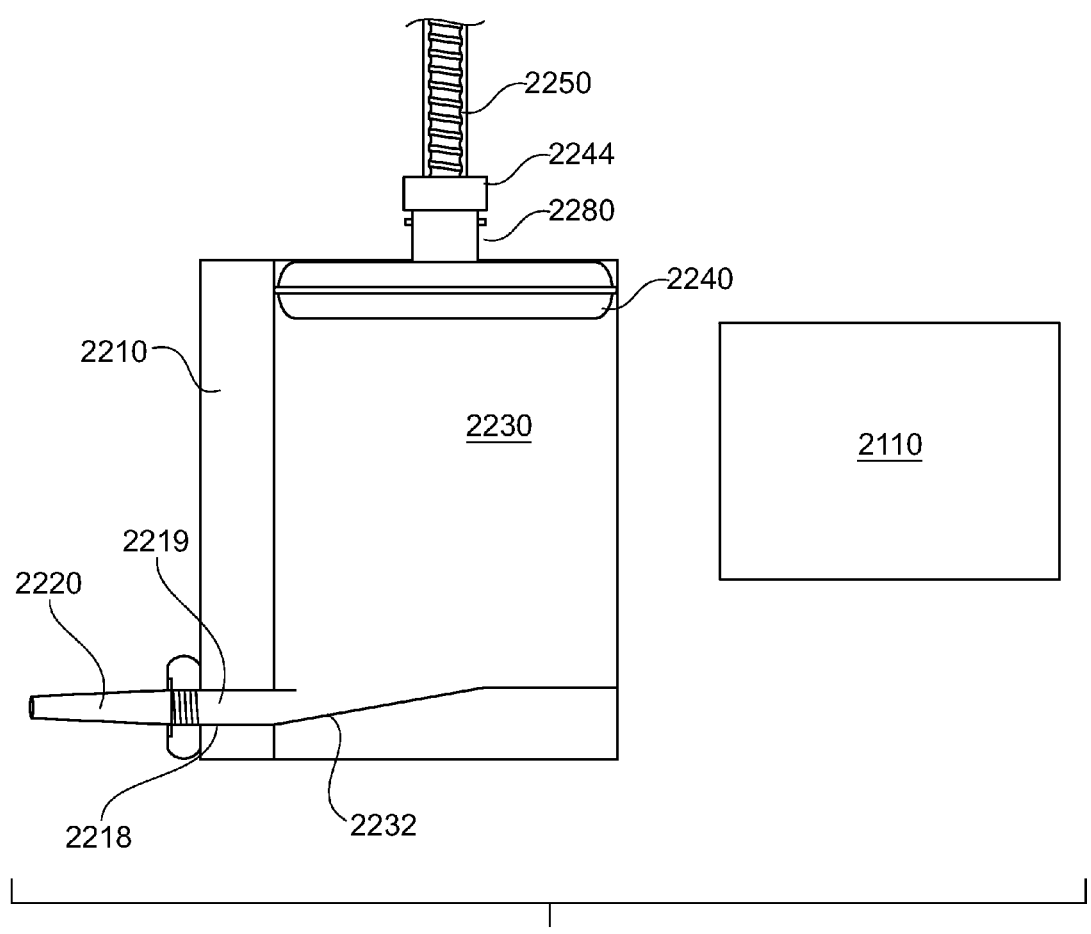
FIG. 22 illustrates a partial side sectional view of a cannoli cream dispenser according to a fourth embodiment.

Referring to FIG. 22, a sectional side view of a cannoli cream dispenser is illustrated according to a fourth embodiment. Thermoelectric cooler 2110 cools the cannoli cream in hopper 2230. Screw 2250 is moved downward with a DC motor (not shown) such that coupling 2244 acts on the piston stem 2280 to move piston plate 2240 downward into the hopper 2230. The piston plate 2240 pushes the cannoli cream into well 2232 of the hopper 2230 so as to move it through the nozzle hole/threaded tube 2219 that passes through nozzle opening 2218 in insulated front door 2210. Tapered nozzle 2220 screws onto the threads of threaded tube 2219 from the outside of door 2210 and is used to dispense the cannoli cream into the cannoli shell.

Figure 23:
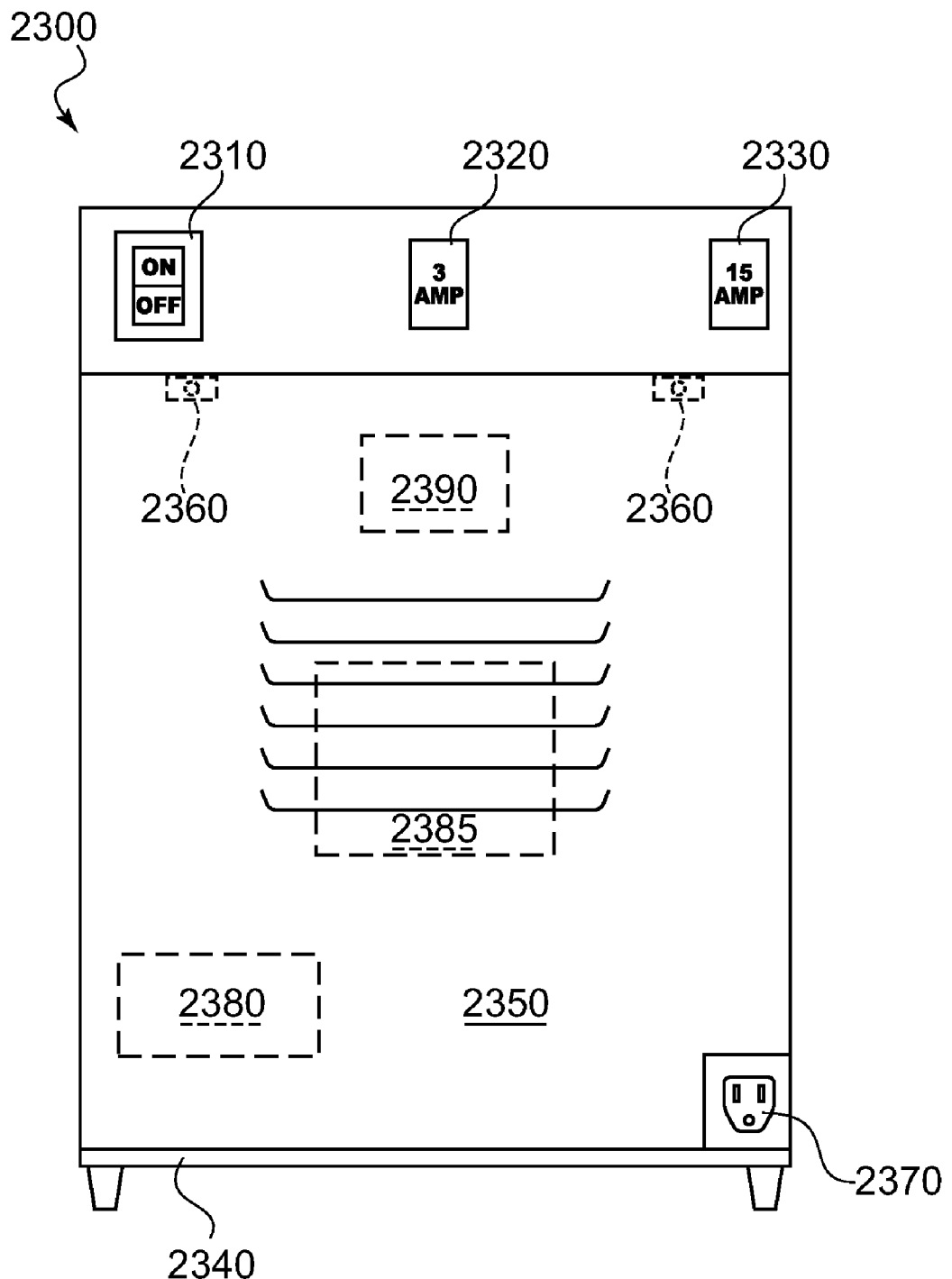
FIG. 23 illustrates a rear elevation view of a cannoli cream dispenser according to a fourth embodiment.

Referring to FIG. 23, a rear elevation view of a cannoli cream dispenser is illustrated according to a fourth embodiment. The dispenser 2300 according to a fourth embodiment includes a rear panel 2350 that has ventilation slots to allow heat to escape from the heat sink 2385 on the hot side of thermoelectric cooler. The panel 2350 drops into drop-in rail 2340 at the base of the rear and then snaps in place with fasteners 2360 at the top of the panel 2350. As such, the rear panel can easily be removed by hand to access and service parts such as transformer 2380 and temperature control board 2390. A power cord or power cord connection 2370 is provided at the rear to supply power to the unit without interfering with operations at the front. An upper rear portion has a power switch 2310, 3 A motor fuse 2320 and 15 A circuit breaker 2330.

Figure 24:
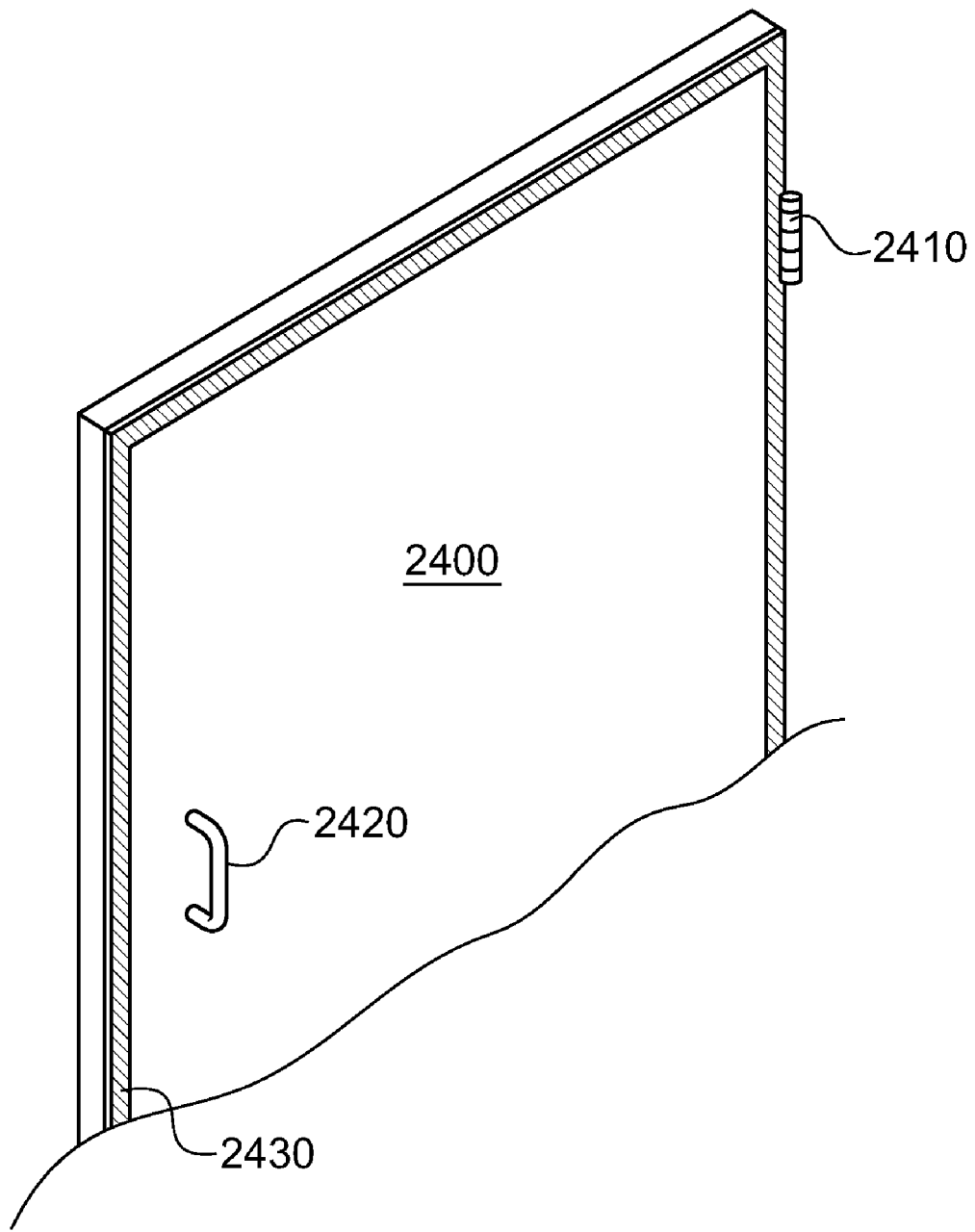
FIG. 24 illustrates a partial detail view of a door of a cannoli cream dispenser according to a fourth embodiment.

Referring to FIG. 24, a detail view of the front door of a cannoli cream dispenser is illustrated according to the fourth embodiment. The door 2400 is insulated and preferably clad in stainless steel. Hinges 2410 are also preferably made of stainless steel. Handle 2420 can take any suitable form, but is preferably formed of stainless steel. The edge of the door 2400 has an airtight flange with a magnetic gasket 2430 as is known in the refrigeration art.

Figure 25A:
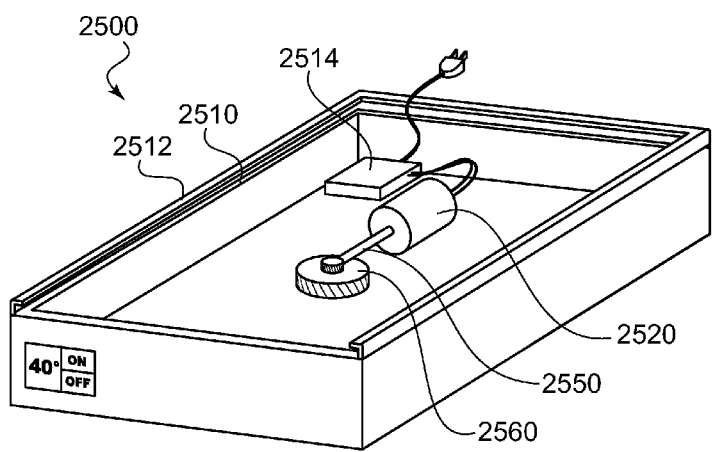
FIG. 25A illustrates a partial view of mechanical portion a cannoli cream dispenser according to a fourth embodiment.
Figure 25B:
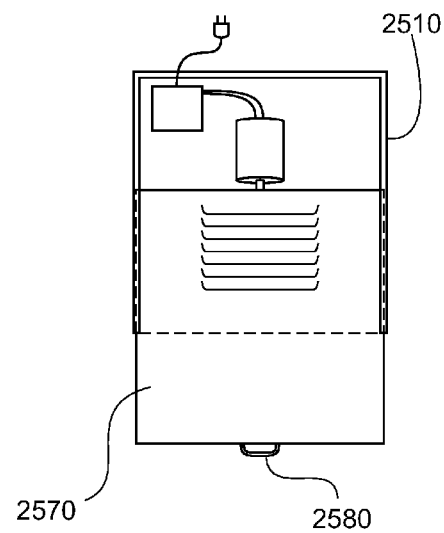
FIG. 25B illustrates a top plan view of an access panel of a cannoli cream dispenser according to a fourth embodiment.

Referring to FIG. 25A, a perspective view of an upper mechanical area of a cannoli cream dispenser is illustrated according to a fourth embodiment. The upper mechanical area 2500 according to a fourth embodiment includes a channel 2512 attached to an upper edge of walls 2510 for engaging an access panel (not shown, see panel 2570 in FIG. 25B). The upper mechanical area houses elements of the piston drive, including but not limited to electrical terminal block 2514, DC motor 2520, motor shaft 2550 and gear 2560. Typically, motor shaft 2550 will have a pinion for engaging a bevel on gear 2560 so as to rotate the gear 2560 for operation of the telescoping screw-jack used to move the piston plate. Preferably, a means for manually rotating the gear 2560 is provided to allow manual withdrawal of the piston in case of a motor malfunction. As illustrated in top view of FIG. 25B, handle 2580 can be used to slide top panel 2570 in and out of the channel at the upper edge of walls 2510 to allow easy access to the upper mechanical area.

Figure 26:
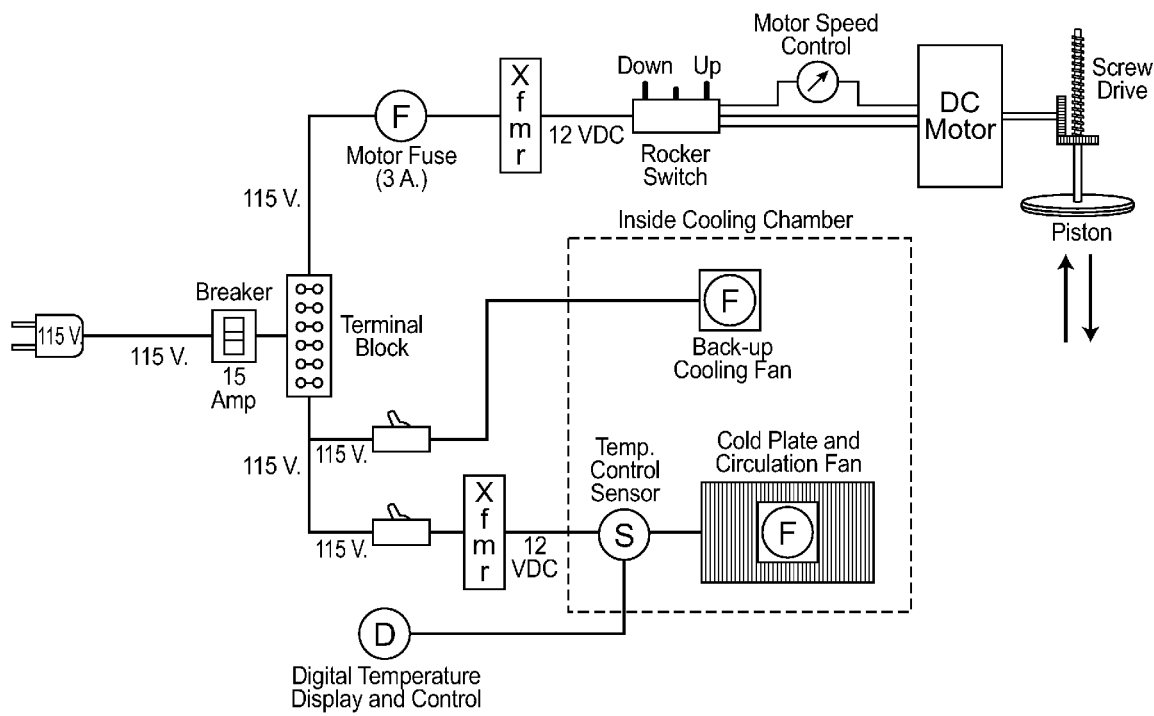
FIG. 26 illustrates a schematic of a cannoli cream dispenser according to a fourth embodiment.

Referring to FIG. 26, an electrical schematic of a cannoli cream dispenser is illustrated according to a fourth embodiment. Electrical power from an AC source is directed to a breaker for safety (e.g., 15 A breaker for 115V AC) and then to a terminal block for distribution to various parts of the unit. AC power is distributed to the dispensing mechanism and goes through a motor protection fuse to a transformer for supplying DC voltage to the motor. The motor is controlled with a rocker switch and motor speed control circuit to operate the screw drive of the dispensing piston.

The terminal block also distributes AC power to the refrigeration unit. One portion branches off to power a switch-controlled back-up cooling fan. Another portion branches through a switch to a transformer to provide DC voltage to the thermoelectric cooler, including the cold plate, circulation fan, temperature control sensor, and digital temperature display and control unit.

According to one embodiment, the dispenser is about 24 inches tall, about 17 inches wide, about 20 to 22 inches deep, and weighs approximately 50 pounds. This size is suitable for countertop use or transport, such as with a cart. The refrigerated area holding the cannoli cream hopper is approximately one square foot and can easily be cooled by thermoelectric or ice pack cooling. Ice pack cooling (i.e., cooled holdover material) acts as a backup cooling system if the thermoelectric cooler fails or is unplugged for transport.

A DC electric geared motor is operated to turn a small pinion gear, which in turn drives a larger bevel gear that is directly connected to a telescoping screw-jack drive. The screw-jack drive forces a piston plate down into a hopper of cannoli cream to expel the cream through a tapered nozzle mounted in a horizontal position at the front of the unit. The nozzle is adapted to dispense desired amounts of cannoli cream for each cannoli shell. The piston plate is adapted to be easily removable for cleaning and servicing.

A forward/reverse (down/up) electric rocker switch operates the DC motor to control the direction the piston plate moves. Preferably, an upper portion of the rocker switch will move the piston upward and withdraw it from the hopper and a lower portion of the rocker will insert the piston into the hopper. When withdrawn, the hopper can be removed for accessing/removing/replacing/cleaning/servicing the piston.

A fresh, full hopper is loaded from the front through the insulated door and a threaded tube or spout on the hopper extends through an opening in the door and connect to a nozzle in a horizontal position. Either the nozzle or the spout can include a one-way mechanism/valve to allow airtight operation. A cream-catching drip tray or shelf pulls out under the nozzle in case of spillage.

The front of the machine has controls for operating the piston and for displaying the inside temperature, preferably in a digital display. Removable, ventilated panels in the top and rear allow access to the refrigeration and dispensing components for periodic maintenance and repairs.

A system and method for dispensing viscous food has been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. An apparatus for storage and dispensing of viscous food material, the apparatus comprising:
    a housing comprising an insulated compartment and an insulated door;
    a food material hopper having an open top, a lower outlet tube, and being removably disposed in the insulated compartment;
    a thermal storage material disposed in the insulated compartment adjacent the food material hopper;
    a cold side of a thermoelectric cooler disposed in the insulated compartment;
    a piston assembly positioned above the food material hopper and comprising a piston plate vertically movable into the open top of the food material hopper to move viscous food material from the food material hopper through the lower outlet tube, wherein the lower outlet tube extends through an opening in the insulated door; and
    a horizontal nozzle attached to the lower outlet tube from an exterior of the insulated door to direct movement of the viscous food material.

2. The apparatus of claim 1, wherein the piston assembly further comprises a motor-operated screw-jack for moving the piston plate.

3. The apparatus of claim 2, wherein the motor-operated screw-jack comprises a pinion gear on a motor shaft that engages a bevel gear that moves a screw in a vertical direction to move the piston plate in a vertical direction.

4. The apparatus of claim 2, further comprising a switch means on an exterior of the rigid housing for operating the motor-operated screw-jack to move the piston plate upward or downward.

5. The apparatus of claim 3, further comprising a user-accessible upper mechanical compartment housing the motor, motor shaft, pinion gear, and bevel gear.

6. The apparatus of claim 2, wherein the motor-operated screw-jack is telescopic.

7. The apparatus of claim 2, wherein the horizontal nozzle is tapered and adapted to dispense user-controlled amounts of cannoli cream and a nozzle cap is attached to the insulated door.

8. The apparatus of claim 7, further comprising a slide-out drip tray attached to a lower portion of the rigid housing below the horizontal nozzle.

9. The apparatus of claim 1, wherein the food material hopper further comprises a well section adjacent the lower outlet tube.

10. The apparatus of claim 1, further comprising means to automatically raise the piston plate a small amount after dispensing the viscous food material.

11. The apparatus of claim 1, further comprising a back-up cooling fan inside the insulated compartment.

12. The apparatus of claim 1, wherein the piston plate is removably coupled to the piston assembly.

13. The apparatus of claim 1, further comprising a digital temperature display and control on an exterior of the rigid housing.

14. The apparatus of claim 1, wherein the thermal storage material is removable and disposed in pockets in the insulated compartment.

15. A method for storing and dispensing of viscous food material, the method comprising:
    holding the viscous food material inside an open-top hopper with a lower outlet tube;
    inserting the open-top hopper into an insulated compartment through a door that includes an opening for the lower outlet tube;
    chilling the viscous food material inside the hopper by cooling the insulated compartment with a thermoelectric cooler and/or a cooled thermal storage material disposed inside the insulated compartment;
    moving a piston plate downward through the open-top hopper to apply dispensing force to the food material; and
    dispensing the food material outside of the insulated compartment through the lower outlet tube.

16. The method of claim 15, further comprising attaching a tapered nozzle in a horizontal position to the lower outlet tube from outside the door of the insulated compartment to dispense the food material in the form of cannoli cream.

17. The method of claim 16, wherein the piston plate is moved downward by a motor-driven or hand-driven screw jack.

18. The method of claim 16, wherein the piston plate is moved downward by a telescoping screw-jack.

19. The method of claim 16, further comprising raising the piston plate a small amount after dispensing the cannoli cream.

20. The method of claim 17, wherein the piston plate is removably attached to the screw-jack.

* * * * *